(12) United States Patent
Saito

(10) Patent No.: US 10,836,028 B2
(45) Date of Patent: Nov. 17, 2020

(54) INTERCHANGEABLE TOOLLESSLY RELEASABLE HANDLES FOR HAND TOOLS AND METHODS OF USING THE SAME

(71) Applicant: Herbavore LLC, Honolulu, HI (US)

(72) Inventor: Robert Saito, Honolulu, HI (US)

(73) Assignee: HERBAVORE LLC, Honolulu, HI (US)

( * ) Notice: Subject to any disclaimer, the term of this patent is extended or adjusted under 35 U.S.C. 154(b) by 0 days.

(21) Appl. No.: 15/624,118

(22) Filed: Jun. 15, 2017

(65) Prior Publication Data

US 2018/0009100 A1    Jan. 11, 2018

Related U.S. Application Data

(60) Provisional application No. 62/376,411, filed on Aug. 18, 2016, provisional application No. 62/360,415, filed on Jul. 10, 2016.

(51) Int. Cl.
| | |
|---|---|
| *B25G 1/10* | (2006.01) |
| *B25G 3/04* | (2006.01) |
| *A01G 3/02* | (2006.01) |
| *B25G 3/08* | (2006.01) |

(52) U.S. Cl.
CPC .............. *B25G 1/102* (2013.01); *A01G 3/02* (2013.01); *A01G 3/021* (2013.01); *B25G 3/04* (2013.01); *B25G 3/08* (2013.01)

(58) Field of Classification Search
CPC .... A01G 3/02; A01G 2003/007; B25G 1/102; B25G 3/04

USPC .......... 30/254–262, 234, 244, 161–162, 190, 30/192, 249–251; D8/5
See application file for complete search history.

(56) References Cited

U.S. PATENT DOCUMENTS

| | | | | |
|---|---|---|---|---|
| 2,742,936 A | * | 4/1956 | Cooley | .................. B23D 51/01 |
| | | | | 30/519 |
| 2,870,573 A | * | 1/1959 | Scadden | .................. A01G 3/00 |
| | | | | 47/1.01 R |
| RE24,831 E | * | 5/1960 | Livermont | .............. B25B 13/08 |
| | | | | 81/177.85 |

(Continued)

FOREIGN PATENT DOCUMENTS

WO    WO-8204292 A1 * 12/1982    ........... B23D 29/002

*Primary Examiner* — Ghassem Alie
*Assistant Examiner* — Bharat C Patel
(74) *Attorney, Agent, or Firm* — Cooley LLP

(57) ABSTRACT

Presented here are toollessly releasable, interchangeable handles for hand tools and methods of use thereof. Hand tool users often experience discomfort and injury because hand tool handles are not well suited to each user's hands. In addition, different hand tools have different handles, so users that switch between hand tools often find a different level of comfort with different hand tools. The disclosed platform for interchangeable handles for hand tools allows a user to attach handles custom fitted to their hand to any corresponding hand tool, and likewise allows different users to share a hand tool by detaching the first user's handles and then attaching a second user's handles. Various embodiments for connecting interchangeable handles to hand tools are shown. Additionally, a fluid reservoir disposed within an interchangeable handle and locking mechanisms for keeping the interchangeable handles attached to the hand tool are disclosed.

23 Claims, 21 Drawing Sheets

(56) References Cited

U.S. PATENT DOCUMENTS

| | | | |
|---|---|---|---|
| 3,039,340 A * | 6/1962 | Zimmerman | B25B 23/0035 |
| | | | 81/177.85 |
| 3,336,668 A * | 8/1967 | Groom | B25B 7/00 |
| | | | 30/239 |
| D238,650 S | 2/1976 | Koblick | |
| D238,925 S | 2/1976 | Lavitch et al. | |
| D239,080 S | 3/1976 | Stevenson | |
| 3,973,179 A * | 8/1976 | Weber | B25F 3/00 |
| | | | 320/113 |
| D244,828 S | 6/1977 | Visco | |
| D248,534 S | 7/1978 | Bäckström et al. | |
| 4,114,268 A | 9/1978 | Hildebrandt et al. | |
| D250,165 S | 11/1978 | Davies | |
| D250,166 S | 11/1978 | Davies | |
| D250,509 S | 12/1978 | Plimmer | |
| D250,988 S | 2/1979 | Plimmer | |
| D251,232 S | 3/1979 | Yamamoto | |
| D251,698 S | 5/1979 | Bartholomew, Jr. | |
| D251,955 S | 5/1979 | Germain | |
| D253,390 S | 11/1979 | Bartholomew | |
| D254,592 S | 4/1980 | Atkins | |
| D254,952 S | 5/1980 | Hildebrandt et al. | |
| D255,763 S | 7/1980 | Ferguson | |
| D255,980 S | 7/1980 | Winget | |
| D256,541 S | 8/1980 | Davies | |
| D256,767 S | 9/1980 | Irelan | |
| D256,768 S | 9/1980 | Irelan | |
| D258,040 S | 1/1981 | Irelan | |
| D258,112 S | 2/1981 | Klapp | |
| D258,798 S | 4/1981 | Ferguson | |
| D261,477 S | 10/1981 | Shaffer | |
| D263,350 S | 3/1982 | Gingher, Jr. | |
| D264,018 S | 4/1982 | Gingher, Jr. | |
| D264,172 S | 5/1982 | Harrison et al. | |
| D264,544 S | 5/1982 | Harrison et al. | |
| D264,545 S | 5/1982 | Harrison et al. | |
| D265,282 S | 7/1982 | Harrison et al. | |
| D265,376 S | 7/1982 | Harrison et al. | |
| D266,478 S | 10/1982 | Bladen | |
| D267,144 S | 12/1982 | Harrison et al. | |
| D268,982 S | 5/1983 | Harrison et al. | |
| D269,401 S | 6/1983 | Pittaway | |
| D269,491 S | 6/1983 | Pittaway | |
| D272,707 S | 2/1984 | Shaffer | |
| D275,362 S | 9/1984 | Ishida et al. | |
| D275,363 S | 9/1984 | Ishida et al. | |
| D275,364 S | 9/1984 | Ishida et al. | |
| D275,645 S | 9/1984 | Ishida et al. | |
| D276,975 S | 1/1985 | Wordtmann | |
| D280,176 S | 8/1985 | Kolb | |
| D282,140 S | 1/1986 | Nalbandyan et al. | |
| 4,567,656 A * | 2/1986 | Wallace | B26B 13/16 |
| | | | 30/262 |
| D284,063 S | 6/1986 | Linden | |
| D284,731 S | 7/1986 | Linden | |
| D285,407 S | 9/1986 | Clivio et al. | |
| D288,166 S | 2/1987 | Pittaway | |
| D288,275 S | 2/1987 | Harrison et al. | |
| D289,250 S | 4/1987 | Pittaway | |
| D290,925 S | 7/1987 | Pittaway et al. | |
| D292,167 S | 10/1987 | Le Gal | |
| D297,903 S | 10/1988 | Ishida et al. | |
| D297,905 S | 10/1988 | Ishida et al. | |
| D299,410 S | 1/1989 | Baroni | |
| D305,292 S | 1/1990 | Kawasaki | |
| D305,858 S | 2/1990 | Ishida et al. | |
| D306,120 S | 2/1990 | Ishida et al. | |
| D307,097 S | 4/1990 | Jasperson | |
| D307,696 S | 5/1990 | Ishida et al. | |
| D311,853 S | 11/1990 | Stormsgaard | |
| D313,334 S | 1/1991 | Novak | |
| 4,980,975 A | 1/1991 | Hodson | |
| D314,317 S | 2/1991 | Thomson | |
| D317,701 S | 6/1991 | Grove | |
| D317,851 S | 7/1991 | Ishida et al. | |
| D319,953 S | 9/1991 | Macha | |
| D320,333 S | 10/1991 | Grove | |
| D323,769 S | 2/1992 | Ishida et al. | |
| D323,960 S | 2/1992 | Wilhelm et al. | |
| D324,470 S | 3/1992 | Grove | |
| D324,628 S | 3/1992 | Ishida et al. | |
| D324,744 S | 3/1992 | Rommerdale | |
| 5,170,559 A | 12/1992 | Orthey et al. | |
| 5,184,404 A * | 2/1993 | Chen | B23D 29/023 |
| | | | 30/249 |
| 5,203,595 A * | 4/1993 | Borzone | A61B 17/1631 |
| | | | 285/325 |
| D336,222 S | 6/1993 | Wensley et al. | |
| D336,412 S | 6/1993 | Wensley et al. | |
| D337,033 S | 7/1993 | DeVille | |
| D341,300 S | 11/1993 | Parsons | |
| D341,526 S | 11/1993 | Clivio | |
| D341,527 S | 11/1993 | Clivio | |
| 5,263,254 A | 11/1993 | Orthey | |
| D342,652 S | 12/1993 | Wensley et al. | |
| D342,657 S | 12/1993 | Choi | |
| D344,218 S | 2/1994 | Wensley et al. | |
| D344,219 S | 2/1994 | Wensley et al. | |
| D344,220 S | 2/1994 | Wensley et al. | |
| D346,538 S | 5/1994 | Florian | |
| D347,556 S | 6/1994 | Choi | |
| D353,523 S | 12/1994 | Her | |
| D353,524 S | 12/1994 | Her | |
| D354,205 S | 1/1995 | Wensley et al. | |
| D354,890 S | 1/1995 | Concari et al. | |
| D356,719 S | 3/1995 | Choi | |
| D357,390 S | 4/1995 | Thompson et al. | |
| D359,205 S | 6/1995 | Her | |
| D359,426 S | 6/1995 | Her | |
| D359,427 S | 6/1995 | Birkholz | |
| D359,890 S | 7/1995 | Wensley | |
| D361,700 S | 8/1995 | Birkholz | |
| D362,162 S | 9/1995 | Wensley | |
| 5,469,625 A * | 11/1995 | Melter | A01G 3/02 |
| | | | 30/190 |
| D367,410 S | 2/1996 | Hortnagl | |
| D367,594 S | 3/1996 | Hortnagl | |
| D369,531 S | 5/1996 | Birkholz | |
| 5,561,904 A | 10/1996 | Chung | |
| D377,440 S | 1/1997 | Kobayashi | |
| D377,588 S | 1/1997 | Birkholz | |
| 5,590,470 A * | 1/1997 | Erbrick | B23D 35/001 |
| | | | 30/250 |
| D380,128 S | 6/1997 | Wu | |
| D380,358 S | 7/1997 | Wu | |
| D381,565 S | 7/1997 | Hibberd | |
| D386,369 S | 11/1997 | Lin | |
| D390,430 S | 2/1998 | Chai et al. | |
| D390,761 S | 2/1998 | Choi | |
| D391,127 S | 2/1998 | Yeh | |
| 5,718,051 A * | 2/1998 | Huang | B23D 21/10 |
| | | | 30/250 |
| D391,460 S | 3/1998 | Wu | |
| D392,519 S | 3/1998 | Hung | |
| D393,189 S | 4/1998 | Spear et al. | |
| D393,401 S | 4/1998 | Clivio | |
| D393,577 S | 4/1998 | Huang | |
| D394,990 S | 6/1998 | Mock | |
| D395,382 S | 6/1998 | Liao | |
| D395,581 S | 6/1998 | Chai et al. | |
| D396,615 S | 8/1998 | Spear et al. | |
| D398,499 S | 9/1998 | Ronan | |
| 5,815,875 A * | 10/1998 | Yamada | A46B 5/0075 |
| | | | 15/167.1 |
| D401,485 S | 11/1998 | Liao | |
| D403,213 S | 12/1998 | Lin | |
| D404,265 S | 1/1999 | Janky | |
| D405,663 S | 2/1999 | Deville | |
| D406,500 S | 3/1999 | Lin | |
| D409,058 S | 5/1999 | Wrigley | |
| 5,918,371 A * | 7/1999 | Herrmann | B25B 7/12 |
| | | | 30/246 |
| D413,052 S | 8/1999 | Staton | |
| D413,496 S | 9/1999 | Wu | |

(56) References Cited

U.S. PATENT DOCUMENTS

| | | |
|---|---|---|
| D414,387 S | 9/1999 | Hung |
| D416,452 S | 11/1999 | Budrow |
| D419,043 S | 1/2000 | Staton |
| D420,555 S | 2/2000 | Chang |
| D422,463 S | 4/2000 | Ronan |
| D422,856 S | 4/2000 | Wu |
| D426,433 S | 6/2000 | Hurst |
| D426,434 S | 6/2000 | Hurst |
| D426,755 S | 6/2000 | Wu |
| D426,756 S | 6/2000 | Hurst |
| D427,036 S | 6/2000 | Ronan |
| D427,491 S | 7/2000 | Deville |
| D427,492 S | 7/2000 | Deville |
| D427,493 S | 7/2000 | Wu |
| D427,859 S | 7/2000 | Deville |
| D427,860 S | 7/2000 | Deville |
| D429,127 S | 8/2000 | Deville |
| 6,108,845 A * | 8/2000 | Hung ............... B25F 1/02 30/260 |
| D431,428 S | 10/2000 | McCalla et al. |
| D431,761 S | 10/2000 | Deville |
| D431,979 S | 10/2000 | Deville |
| D433,887 S | 11/2000 | Deville |
| D433,888 S | 11/2000 | Choi |
| D434,285 S | 11/2000 | Podlesny |
| D434,286 S | 11/2000 | Lin |
| D434,955 S | 12/2000 | Ronan |
| D437,751 S | 2/2001 | Lin |
| D438,071 S | 2/2001 | Deville |
| D439,117 S | 3/2001 | Deville |
| D439,812 S | 4/2001 | Staton |
| D441,622 S | 5/2001 | van den Hout |
| D443,188 S | 6/2001 | Shih |
| D444,043 S | 6/2001 | Choi |
| D446,094 S | 8/2001 | Ebert |
| D446,095 S | 8/2001 | Lai |
| D450,551 S | 11/2001 | Lai |
| D451,354 S | 12/2001 | Liu |
| D453,104 S | 1/2002 | Liu |
| 6,336,272 B1 * | 1/2002 | Lee ............... B26B 13/16 30/261 |
| D455,329 S | 4/2002 | Renner |
| D455,938 S | 4/2002 | Wu |
| D457,041 S | 5/2002 | Chai |
| D457,400 S | 5/2002 | Chai |
| D457,401 S | 5/2002 | Clivio |
| D457,402 S | 5/2002 | Heck et al. |
| D457,791 S | 5/2002 | Clivio |
| 6,385,808 B1 * | 5/2002 | Yamada ............... A46B 5/0075 15/106 |
| D458,094 S | 6/2002 | Clivio |
| D458,815 S | 6/2002 | Meyerratken |
| D458,816 S | 6/2002 | Meyerratken |
| D459,168 S | 6/2002 | Meyerratken |
| D462,586 S | 9/2002 | Halpern et al. |
| D463,227 S | 9/2002 | Choi |
| D464,539 S | 10/2002 | Richwine et al. |
| D464,540 S | 10/2002 | Richwine et al. |
| D464,541 S | 10/2002 | Richwine et al. |
| D464,542 S | 10/2002 | Clivio |
| D464,543 S | 10/2002 | Deville |
| D464,854 S | 10/2002 | Lai |
| D464,855 S | 10/2002 | Clivio |
| D467,139 S | 12/2002 | Deville |
| D467,476 S | 12/2002 | Lai et al. |
| D469,323 S | 1/2003 | Linden |
| D470,387 S | 2/2003 | Yeh |
| D470,732 S * | 2/2003 | Wu .................... D8/5 |
| D472,433 S | 4/2003 | Richwine et al. |
| D473,433 S | 4/2003 | Choi |
| D473,764 S | 4/2003 | Wu |
| D474,946 S | 5/2003 | Huang |
| D475,902 S | 6/2003 | Wu |
| D476,199 S | 6/2003 | Richwine et al. |
| D478,255 S | 8/2003 | Deville |
| D478,256 S | 8/2003 | Shih |
| D478,792 S | 8/2003 | Richwine et al. |
| D479,960 S | 9/2003 | Huang |
| D481,273 S | 10/2003 | Huang |
| D482,580 S | 11/2003 | Richwine et al. |
| 6,640,441 B1 * | 11/2003 | Huang ............... B23D 21/06 30/179 |
| D483,235 S | 12/2003 | Deville |
| D486,361 S | 2/2004 | Wu |
| D487,386 S | 3/2004 | Clivio |
| 6,725,547 B2 * | 4/2004 | Wu ............... A01G 3/02 30/254 |
| D491,775 S | 6/2004 | Tomchak et al. |
| D494,027 S | 8/2004 | Lin |
| D494,430 S | 8/2004 | Lin |
| D494,431 S | 8/2004 | Wu |
| 6,796,389 B2 * | 9/2004 | Pusateri ............... B25F 5/006 173/162.2 |
| D496,837 S | 10/2004 | Tomchak et al. |
| D496,838 S | 10/2004 | Tomchak et al. |
| D496,839 S | 10/2004 | Richwine et al. |
| D497,784 S | 11/2004 | Picaza |
| D498,396 S | 11/2004 | Overthun et al. |
| D499,316 S | 12/2004 | Tatic |
| D499,317 S | 12/2004 | Tatic |
| D500,235 S | 12/2004 | Albert et al. |
| D500,236 S | 12/2004 | Albert et al. |
| D500,941 S | 1/2005 | Tatic |
| D500,942 S | 1/2005 | Lai |
| D501,378 S | 2/2005 | Tatic |
| D501,379 S | 2/2005 | Lipscomb et al. |
| D501,765 S | 2/2005 | Tatic |
| D501,766 S | 2/2005 | Collins |
| D502,066 S | 2/2005 | Huang |
| D502,067 S | 2/2005 | Albert et al. |
| D502,068 S | 2/2005 | Tatic |
| D503,324 S | 3/2005 | Carlson et al. |
| D503,595 S | 4/2005 | Lipscomb et al. |
| D506,906 S | 7/2005 | Wu |
| D509,115 S | 9/2005 | Wu |
| D510,002 S | 9/2005 | Lai |
| 6,952,876 B2 * | 10/2005 | Frazer ............... A01G 3/02 30/123.3 |
| 6,964,099 B1 * | 11/2005 | Zeng ............... A01G 3/02 30/254 |
| D519,013 S | 4/2006 | Schmick |
| D520,315 S | 5/2006 | Deter |
| D522,322 S | 6/2006 | Cirillo |
| D523,709 S | 6/2006 | Knox |
| 7,080,576 B2 * | 7/2006 | Johnson ............... B25D 1/04 7/143 |
| D528,378 S | 9/2006 | LeBoeuf, Jr. |
| D528,380 S | 9/2006 | Sue |
| D529,774 S | 10/2006 | Davis |
| D536,940 S | 2/2007 | Peterson et al. |
| D537,311 S | 2/2007 | Peterson et al. |
| D545,646 S | 7/2007 | Shan |
| D547,139 S | 7/2007 | Shan |
| D547,140 S | 7/2007 | Shan |
| D547,141 S | 7/2007 | Shan |
| D548,027 S | 8/2007 | Demar et al. |
| D550,048 S | 9/2007 | Robson |
| D552,435 S | 10/2007 | Bohlman et al. |
| D552,947 S | 10/2007 | Ewasiuk |
| D555,442 S | 11/2007 | Kaposi |
| D557,086 S | 12/2007 | Lipscomb et al. |
| D557,096 S | 12/2007 | Wu |
| D558,003 S | 12/2007 | Lai |
| D562,649 S | 2/2008 | Zeller et al. |
| D564,310 S | 3/2008 | Zeller et al. |
| D564,311 S * | 3/2008 | Wu .................... D8/5 |
| D567,601 S | 4/2008 | Klecker et al. |
| D570,167 S | 6/2008 | Kaposi |
| D571,169 S | 6/2008 | Pollock et al. |
| D571,624 S * | 6/2008 | Huang .................... D8/5 |
| D575,121 S | 8/2008 | Junck |
| D578,360 S | 10/2008 | Nellenbach et al. |
| D578,841 S * | 10/2008 | Huang .................... D8/5 |
| D580,235 S | 11/2008 | Wu |

(56) References Cited

U.S. PATENT DOCUMENTS

| | | | |
|---|---|---|---|
| D580,236 S | 11/2008 | Wu | |
| D582,733 S | 12/2008 | Davies et al. | |
| D583,202 S | 12/2008 | Nellenbach et al. | |
| D584,121 S | 1/2009 | Fancelli | |
| D585,250 S | 1/2009 | Lee et al. | |
| D585,251 S | 1/2009 | Lee et al. | |
| D591,570 S | 5/2009 | Lee et al. | |
| D595,100 S | 6/2009 | Nellenbach et al. | |
| D595,548 S | 7/2009 | Lipscomb et al. | |
| D600,080 S | 9/2009 | Liu | |
| D600,092 S | 9/2009 | Peterson et al. | |
| D600,514 S | 9/2009 | Butcher et al. | |
| D602,315 S | 10/2009 | Butcher et al. | |
| D603,665 S | 11/2009 | Trewartha et al. | |
| D603,672 S | 11/2009 | Baxter | |
| D606,816 S | 12/2009 | Deville | |
| D607,702 S | 1/2010 | Wu | |
| D611,793 S | 3/2010 | Trewartha et al. | |
| 7,735,399 B2 * | 6/2010 | Robinson | B25G 1/06 81/177.8 |
| D619,434 S | 7/2010 | Goetz et al. | |
| D620,770 S | 8/2010 | Weigand | |
| D620,771 S | 8/2010 | Goetz et al. | |
| D621,234 S | 8/2010 | Goetz et al. | |
| D622,112 S | 8/2010 | Goetz et al. | |
| D625,978 S | 10/2010 | Zeng | |
| D628,030 S | 11/2010 | Mullen et al. | |
| D628,031 S | 11/2010 | Stokes et al. | |
| D628,032 S | 11/2010 | Stokes et al. | |
| D630,067 S | 1/2011 | Block et al. | |
| D630,479 S | 1/2011 | Yang | |
| 7,886,446 B2 * | 2/2011 | Yu Chen | B26B 13/26 30/175 |
| D634,594 S | 3/2011 | Haung | |
| D634,993 S | 3/2011 | Huang | |
| D634,994 S | 3/2011 | Huang | |
| D634,995 S | 3/2011 | Huang | |
| 7,895,757 B1 * | 3/2011 | Huang | B26B 13/285 30/192 |
| D635,416 S | 4/2011 | Huang | |
| D635,417 S | 4/2011 | Huang | |
| D635,418 S | 4/2011 | Huang | |
| D638,673 S | 5/2011 | Huang | |
| D638,674 S | 5/2011 | Huang | |
| D638,675 S | 5/2011 | Huang | |
| D638,676 S | 5/2011 | Huang | |
| D638,677 S | 5/2011 | Huang | |
| D640,106 S | 6/2011 | Molina et al. | |
| D642,032 S | 7/2011 | Molina et al. | |
| D642,033 S | 7/2011 | Molina et al. | |
| D642,035 S | 7/2011 | Molina et al. | |
| D646,533 S | 10/2011 | Steinhobel et al. | |
| D646,534 S | 10/2011 | Deville | |
| D648,192 S | 11/2011 | Wu | |
| D648,605 S | 11/2011 | Lee | |
| D649,420 S | 11/2011 | Cunningham et al. | |
| D650,249 S | 12/2011 | Lee | |
| D651,053 S | 12/2011 | Roberts et al. | |
| D651,487 S | 1/2012 | Roberts et al. | |
| D652,272 S | 1/2012 | Atnip et al. | |
| D652,277 S | 1/2012 | Cunningham et al. | |
| D652,699 S | 1/2012 | Atnip et al. | |
| D654,767 S | 2/2012 | Mayer | |
| 8,109,003 B2 * | 2/2012 | Liu | A01G 3/02 30/236 |
| D655,990 S | 3/2012 | Block | |
| D660,104 S | 5/2012 | Atnip et al. | |
| 8,181,351 B1 * | 5/2012 | Brim, III | A01G 3/02 30/123.3 |
| D663,175 S | 7/2012 | Steinhobel et al. | |
| D664,406 S | 7/2012 | Atnip et al. | |
| 8,268,002 B2 * | 9/2012 | Blackwell | A61F 2/4455 623/17.16 |
| D671,809 S | 12/2012 | Huang | |
| D677,133 S | 3/2013 | Zhang et al. | |
| D679,559 S | 4/2013 | Masalin et al. | |
| D680,829 S | 4/2013 | Nelson | |
| D684,828 S | 6/2013 | Masalin et al. | |
| D690,172 S | 9/2013 | Rozumovich | |
| D691,005 S | 10/2013 | Wu | |
| D691,433 S | 10/2013 | Nies et al. | |
| D691,434 S | 10/2013 | Nies et al. | |
| D691,435 S | 10/2013 | Nies et al. | |
| D691,436 S | 10/2013 | Nies et al. | |
| 8,549,757 B2 * | 10/2013 | Wu | B26B 13/16 30/194 |
| D693,192 S | 11/2013 | Masalin et al. | |
| D693,657 S | 11/2013 | Wu | |
| D693,658 S | 11/2013 | Liu | |
| D693,659 S | 11/2013 | Liu | |
| D695,082 S | 12/2013 | Huang | |
| 8,601,698 B2 * | 12/2013 | Huang | A01G 3/02 30/123 |
| D698,214 S | 1/2014 | Sade et al. | |
| 8,621,752 B1 * | 1/2014 | Brim, III | A01G 3/02 30/123.3 |
| D698,618 S | 2/2014 | Atnip et al. | |
| D699,526 S | 2/2014 | Wang | |
| D702,516 S | 4/2014 | Liu | |
| D703,498 S | 4/2014 | Atnip et al. | |
| 8,701,294 B2 * | 4/2014 | Bruce | A01G 3/02 30/236 |
| D704,012 S | 5/2014 | Nies et al. | |
| D704,013 S | 5/2014 | Nies et al. | |
| D704,520 S | 5/2014 | Lyytikainen et al. | |
| D705,023 S | 5/2014 | Chen | |
| D706,096 S | 6/2014 | Stokes et al. | |
| D706,097 S | 6/2014 | Lyytikainen et al. | |
| D706,590 S | 6/2014 | Sade et al. | |
| D714,597 S | 10/2014 | Lee | |
| D715,113 S | 10/2014 | Masalin et al. | |
| D715,114 S | 10/2014 | Lyytikainen et al. | |
| D715,115 S | 10/2014 | Sade et al. | |
| D715,116 S | 10/2014 | Sade et al. | |
| D715,607 S | 10/2014 | Lyytikainen et al. | |
| D716,114 S | 10/2014 | Lyytikainen et al. | |
| D716,115 S | 10/2014 | Lyytikainen et al. | |
| D717,133 S | 11/2014 | Lyytikainen et al. | |
| D717,134 S | 11/2014 | Lyytikainen et al. | |
| D720,968 S | 1/2015 | Roberts et al. | |
| D720,969 S | 1/2015 | Lipscomb et al. | |
| D721,255 S | 1/2015 | Lee | |
| D722,479 S | 2/2015 | Lyytikainen | |
| D723,885 S | 3/2015 | Boix et al. | |
| D723,886 S | 3/2015 | Boix et al. | |
| D723,887 S | 3/2015 | Boix et al. | |
| D724,908 S | 3/2015 | Constantine et al. | |
| 9,066,473 B2 * | 6/2015 | Podlesny | A01G 3/021 |
| D750,454 S | 3/2016 | Lambin | |
| D750,455 S | 3/2016 | Wu | |
| 9,295,559 B2 * | 3/2016 | Farris | A61F 2/442 |
| 9,345,200 B2 * | 5/2016 | Cunningham | A01G 3/0251 |
| 9,975,663 B2 * | 5/2018 | Voelker | A01M 7/0046 |
| 10,046,894 B1 * | 8/2018 | Carter | B65D 69/00 |
| 2002/0137006 A1 * | 9/2002 | Gugel | A61C 3/025 433/88 |
| 2006/0027056 A1 * | 2/2006 | Hsien | B25B 7/00 81/427 |
| 2006/0230886 A1 * | 10/2006 | Hsien | B25G 1/06 81/424 |
| 2009/0090010 A1 * | 4/2009 | Lin | A01G 3/02 30/254 |
| 2011/0154669 A1 * | 6/2011 | Liu | A01G 3/02 30/260 |
| 2012/0047750 A1 * | 3/2012 | Maag | A01G 3/02 30/251 |
| 2015/0001317 A1 * | 1/2015 | Wei | B05B 11/0059 239/375 |
| 2017/0122559 A1 * | 5/2017 | Wick | G02B 25/002 |
| 2018/0177343 A1 * | 6/2018 | Bonaccorso | A47J 45/071 |

\* cited by examiner

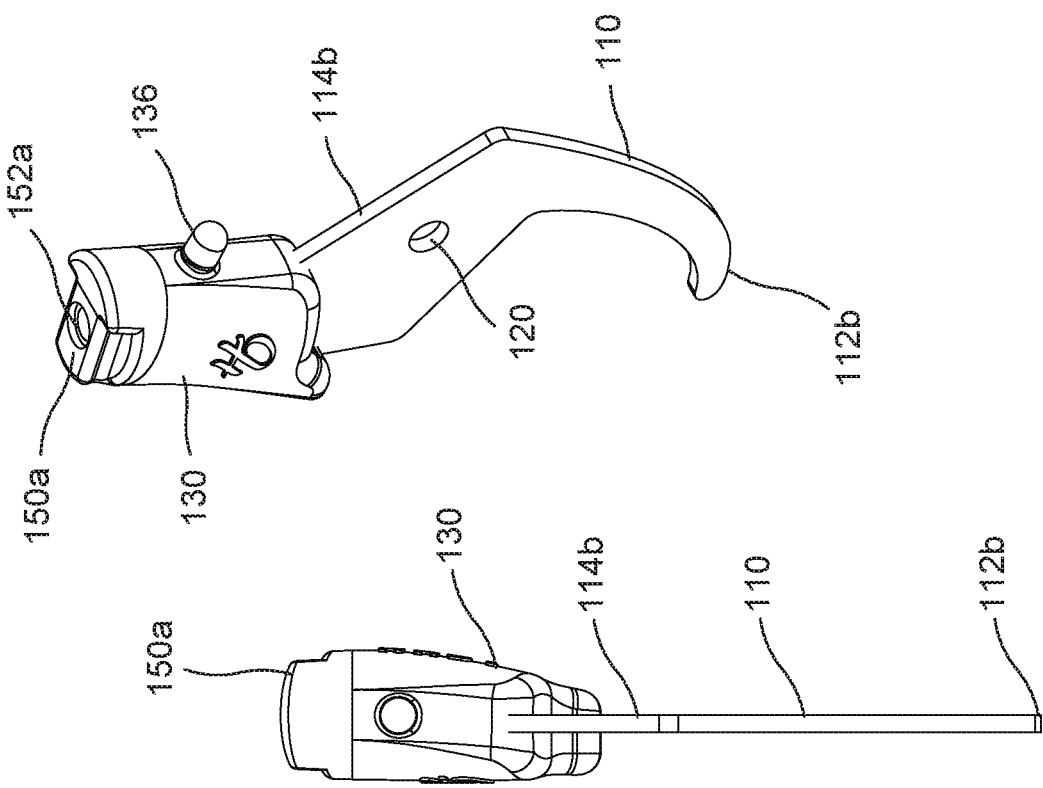
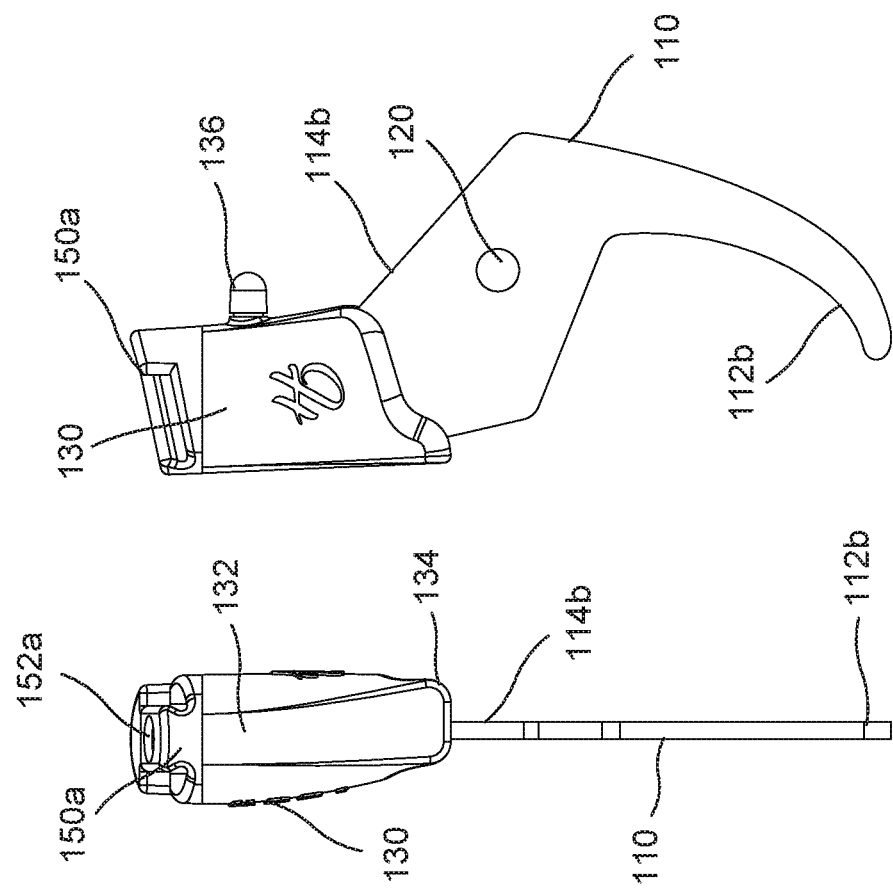
FIG. 11

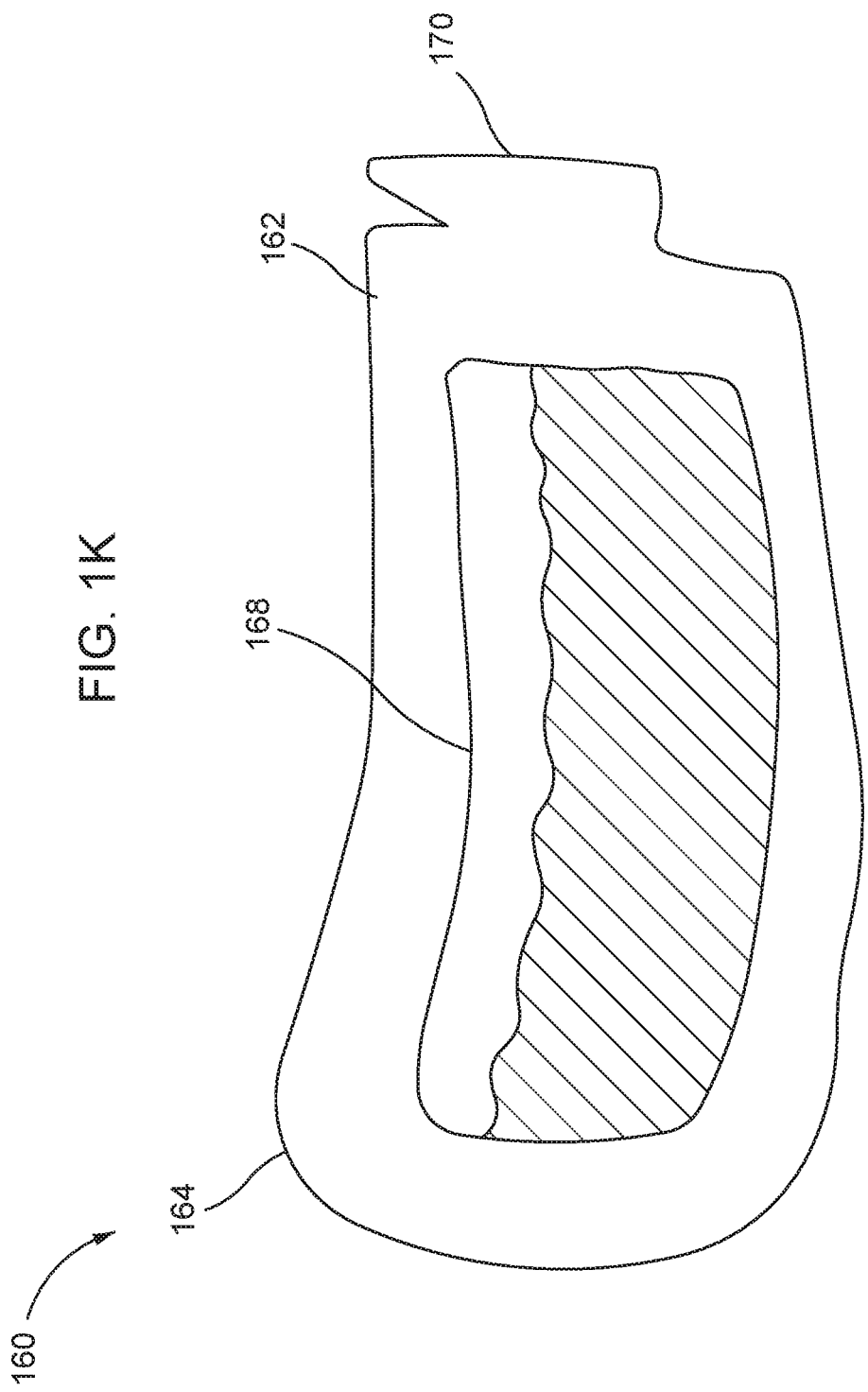

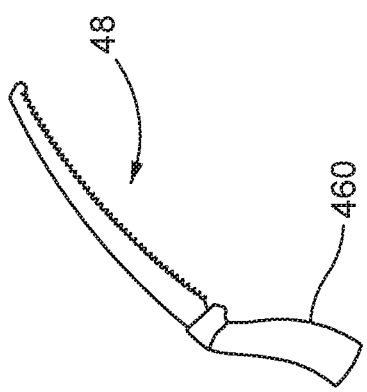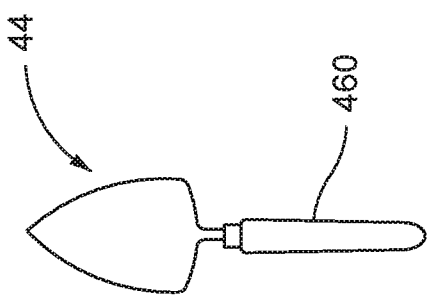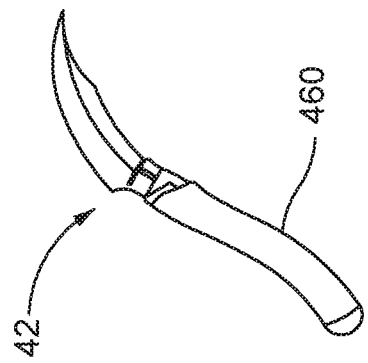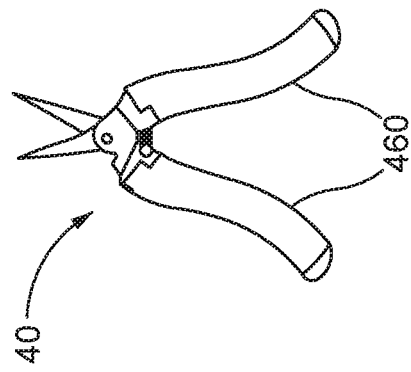

FIG. 5A
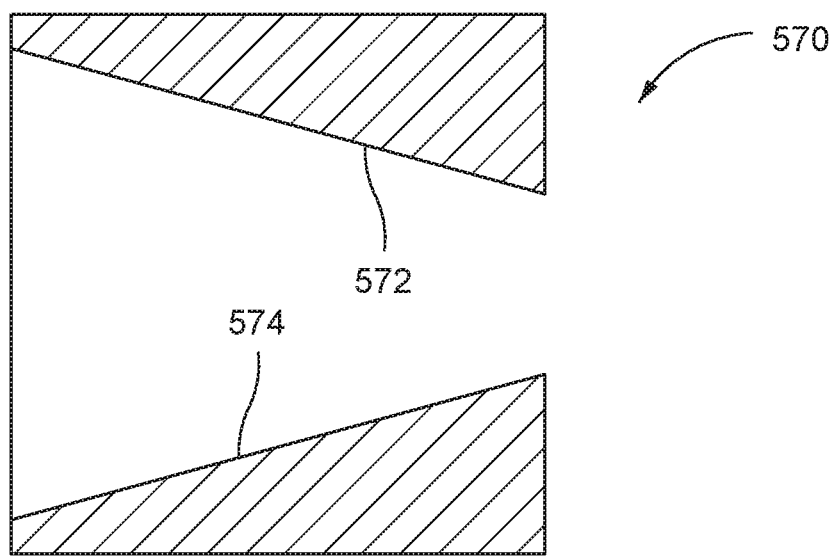
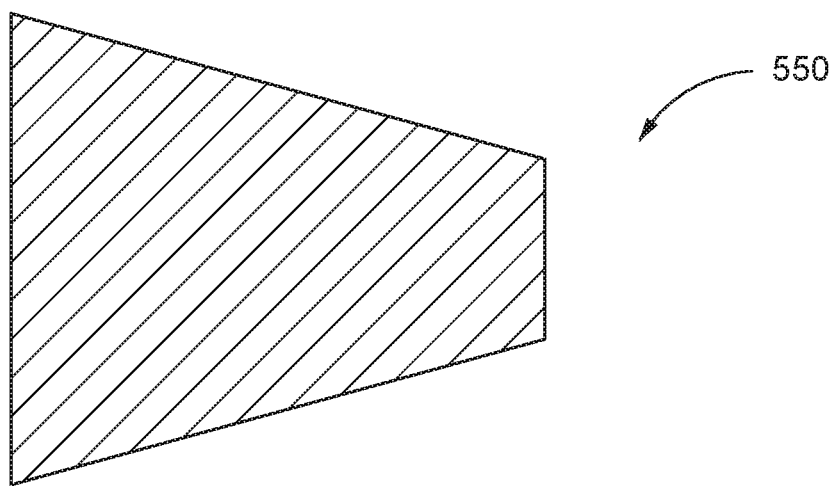

FIG. 5C
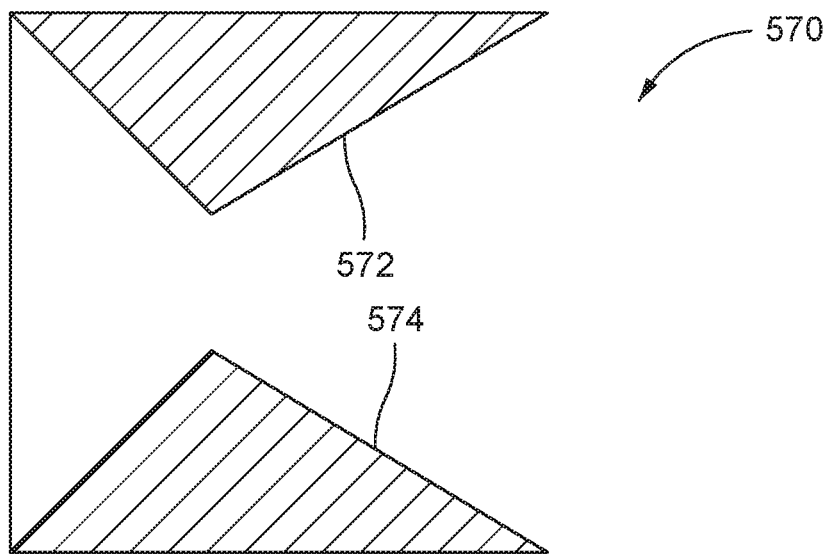
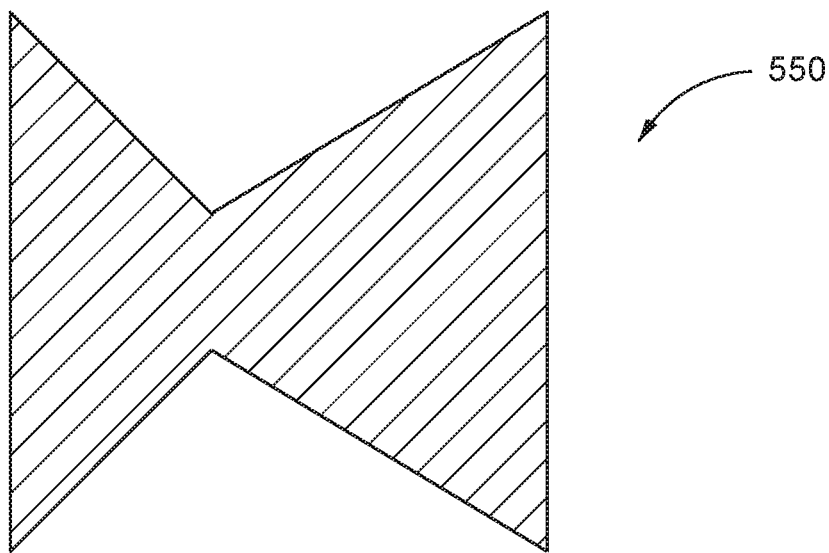

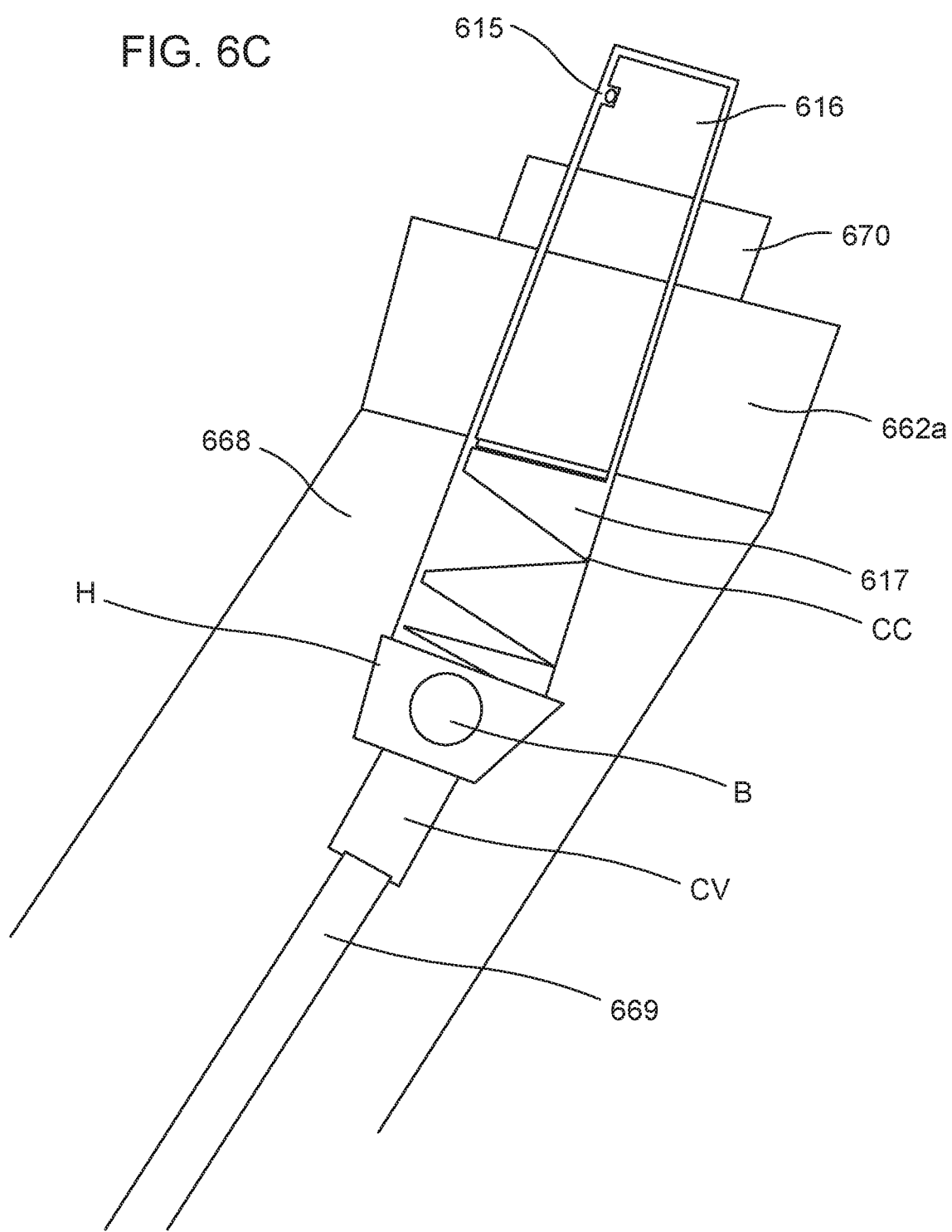

INTERCHANGEABLE TOOLLESSLY RELEASABLE HANDLES FOR HAND TOOLS AND METHODS OF USING THE SAME

CROSS-REFERENCE TO RELATED APPLICATIONS

This application claims priority to U.S. Application No. 62/360,415, filed Jul. 10, 2016, and U.S. Application No. 62/376,411, filed Aug. 18, 2016, the disclosures of which are hereby incorporated by reference in their entireties.

BACKGROUND

In horticulture, agriculture, lawn care, gardening, construction, and other similar fields, hand tools are used quite often for a wide variety of applications. Traditional hand tools are usually made from a hard plastic or other similarly inelastic materials and are usually dimensioned and configured without regard for a user's hand characteristics or differences between users' hands. This lack of ergonomic handles can lead to repetitive use injuries for frequent users. This can also make it difficult for users to share hand tools with other users and to change between hand tools without discomfort or injury.

In the case of many hand tools, such as hand pruners, herb trimmers, and herb scissors, a handle can be made of plastic or some other hard material and a cutting implement can be made of stainless steel, titanium, or any other hard metal. Handles for hand tools with cutting implements are often fixed to the cutting implement and treated as a single unit attached to the body of the hand tool. Hand tools are often made up or at least two pieces: a first lever with a first end comprising a first cutting or shearing element and a second lever with a first end comprising a second cutting or shear element complementary to the first cutting or shearing element. These pieces often rotate around a pin or bolt or other element used to connect the two levers to each other and to guide rotational movement of the two levers around an axis of rotation.

While hand tools and the handles thereof may vary in size and design, typical, though not all, configurations includes two fixed handles connected together. Both of the fixed handles are typically configured such that a first end defines a handle and a second end defines a cutting edge or other such contacting element, at least in part. The two handles with blades can be connected together at a fastening point and the blades can slide against each other to form a moving pinch point between the two blades that results in a cutting action when engaged with a material to be cut. Due to the handles being fixed, traditional hand tool handles, including herb scissors and pruning shear handles, tend to be identical or substantially similar in design as any other tool commercially available from the same producer and listed under the same product number or product name.

A user can operate a hand tool by squeezing the tool's handles inwards towards each other, forcing the blades to slide by one another (e.g., as in bypass type shears) or to contact one another (e.g., as in anvil type loppers). The cutting or other operation happens when the blades or other contacting members are in the closed state. A spring or other such mechanism can be positioned between the handles to push the handles apart after the user removes the force applied to the handles, thus moving the blades away from each other. This enables the user to squeeze to close the blades together and release pressure to allow the spring to open up the blades for repeated cutting. Some herb scissors do not have springs; instead, the operator has to manually move the scissor blades away from each other by reversing the direction of rotation and the force applied to the handles. When operating the hand tool, position of the tool in three dimensional space and the opening/closing of the contacting member or tool head can be guided by the user who engages the handles.

SUMMARY

Disclosed herein is a garden implement comprising, at least in part, a head having a contacting element, a first arm, and a second arm. The first arm defines a first ridge, and the second arm defines a second ridge. A first detachable handle defines a first channel into which the first ridge of the first arm is slidably disposed. A second detachable handle has a second channel into which the second ridge of the second arm is slidably disposed.

Disclosed herein is a hand tool that can comprise, at least in part, a head having at least one of a contacting element. The hand tool can further comprise at least one of a first arm and/or a second arm. At least one of the first arm and/or the second arm has a first end and a second end, the first end connected to or comprising the contacting element. The second end can be dimensioned and configured to define at least one of a ridge or a channel. The hand tool can further comprise an interchangeable handle that connects to the first arm or second arm at the second end. The interchangeable handle can be dimensioned and configured to connect to the first arm or the second arm in a manner that is both locking and releasable. The interchangeable handles can be connected to the arms such that a user can apply rotational force to the axis of rotation against a spring or other such mechanism to cause the contacting element such as scissors or blades or pliers or another such contacting element to move from a first (open) configuration to a second (closed) configuration or to some point between the first and second configuration.

BRIEF DESCRIPTION OF THE DRAWINGS

FIG. 1I is a series of perspective views of a first piece of the contacting element and the first arm.

FIG. 1K shows an interchangeable handle defining a cavity.

FIG. 4A shows a bladed cutting tool with interchangeable handles.

FIG. 4B shows a bladed tool with an interchangeable handle.

FIG. 4C shows a digging tool with an interchangeable handle.

FIG. 4D shows a sawing tool with an interchangeable handle.

FIG. 5A shows a side view of a ridge and channel for connecting an interchangeable handle to a hand tool.

FIG. 5C shows a side view of a ridge and channel for connecting an interchangeable handle to a hand tool.

FIG. 6C shows one possible configuration for a pumping mechanism for delivering fluid from the cavity within the interchangeable handle of FIG. 6A.

DETAILED DESCRIPTION

Figure 1A:
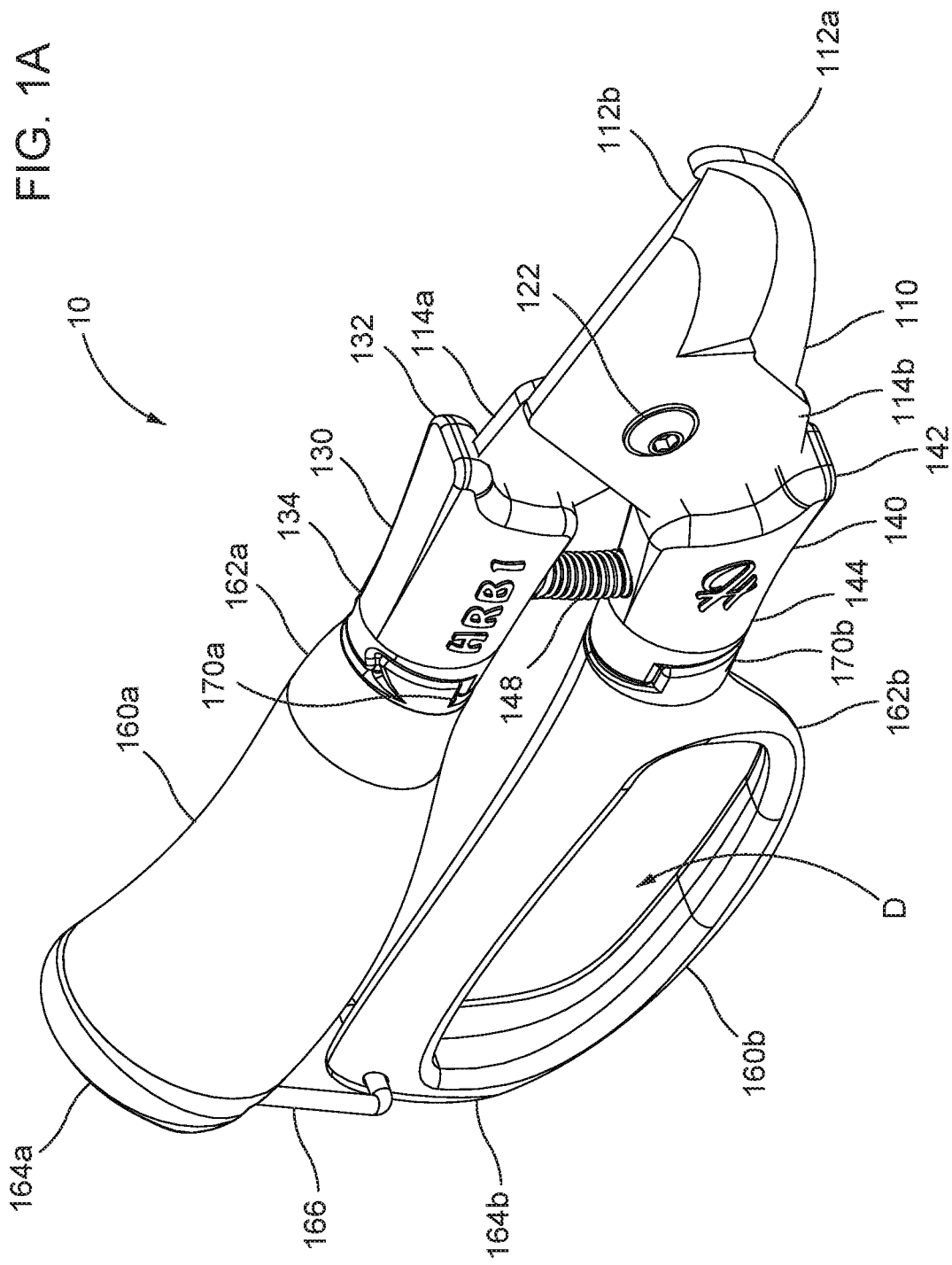
FIG. 1A is a perspective view of a hand tool with interchangeable handles.
Figure 1B:
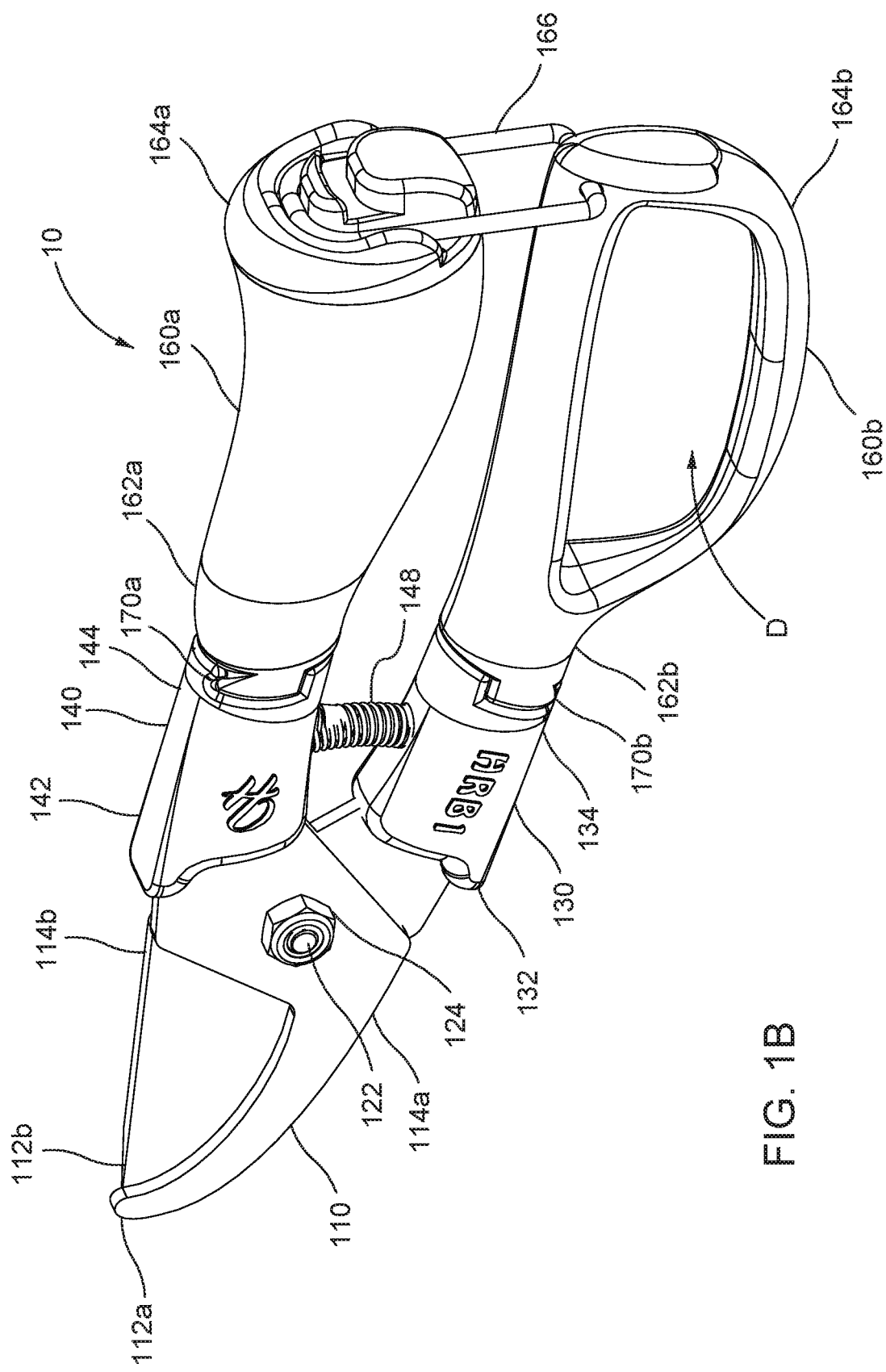
FIG. 1B is a perspective view of the hand tool with interchangeable handles of FIG. 1A.

Disclosed herein are hand tools with toollessly releasable, interchangeable, custom molded handles and methods of using the same.

The term "hand tool" can refer to a tool held in the hand and operated without electricity or other power. In the present disclosure, the term "handle" can refer to the part of a hand tool that is held when the user is holding, carrying, or using the hand tool. The handle can be operably engaged by a user to position a contacting surface in space and for the user to apply force to the handle. In other instances, the handle can be used to move the hand tool through space, for example, to swing a hammer or move a saw in a reciprocating motion.

The disclosed hand tools with interchangeable handles and methods of use thereof address and remedy many of the various deficiencies of current hand tools. Traditional hand tools are usually made from a hard plastic or other similarly inelastic material and are usually dimensioned and configured without regard for a user's hand characteristics or differences between users' hands. This lack of ergonomic handles can lead to repetitive use injuries for frequent users. This can also make it difficult for users to share hand tools with other users and to change between hand tools without discomfort or injury.

The disclosed hand tools with interchangeable handles enable a user to connect a set of interchangeable handles to a hand tool that are highly customized to that user's hands and other characteristics. This is beneficial because individual users vary in hand size, dominant handedness, preference of hand orientation when operating a hand tool, hand width or span, finger length, finger diameter, hand strength, wrist or arm strength, and many other aspects fundamental to the safe and comfortable operation of hand tools. For most traditional hand tools, handle length, width, depth, radius, diameter, taper angle, cushioning, and/or other dimensional characteristics of the handles can vary widely between different producers, brands, models, product lines, and time of production. In other words, traditional hand tools lack the customization or individualization needed to meet the needs of a wide array of users and lack the similarity between different commercially available products to enable a user to easily find a hand tool with a handle that works well for them and then share the same hand tool with another user with different needs.

The disclosed hand tools with interchangeable handles allow various users to each have a highly customized interchangeable handle or set of interchangeable handles and to each connect their respective customized interchangeable handles to a hand tool during use of that hand tool or to a series of hand tools as each is used in turn. This differentiates the disclosed hand tools because traditional hand tools do not offer users the ability to change handle shape, orientation, or type of handle to cater to each individuals user's needs. Not all individuals have the same preferences, and the inability to cater to their needs can lead to discomfort. This discomfort in the near-term may cause blisters, hand pains, and other physical pains. When used over a longer period of time, traditional hand tools may cause, aggravate, or worsen acute medical conditions, such as swelling, bruises, pulled muscles, torn ligaments, or bone fractures, and chronic medical conditions, such as tendonitis or carpal tunnel syndrome. In addition, traditional hand tools that are not designed ergonomically can lead to hand and arm strength loss, general discomfort, overall fatigue, lightheadedness, the need for longer periods of rest between periods of work, and other detrimental outcomes.

Injuries and hand pain can be more of a problem for elderly adults, especially those with arthritis, many have turned to gardening as a way to stay active and healthy. This aging population at times may experience fatigue or loss of power in their limbs due to prolonged periods of activity. Some users cannot squeeze hard to the point where they can cut things efficiently for a given amount of time. For these users, operating herb scissors are difficult. Users with low strength levels in their hands find it increasingly difficult to cut things over long periods of time or in cutting materials with larger diameters. Typical spring loaded herb scissors with no operating points of leverages do not solve this problem for users in this situation.

The disclosed hand tools with interchangeable handles also optionally feature an inner volume for containing a replenishing supply of lubricating or sterilizing fluid and means for communicating that fluid to a particular part or point of the hand tool. This represents a big improvement over traditional hand tools because it reduces the time and effort necessary to sterilize the blades or lubricate the axis of rotation. By way of example, if a gardener is using herb scissors or a similar hand tool to maintain or harvest different plant species, care should be taken to ensure there is no cross contamination of plant pests and/or pathogens. Growers, farmers, and gardeners tend to spray their herb scissors or garden pruners with a liquid that sterilizes their blades such as isopropyl alcohol. This task requires two hands and requires the operator to stop what they are doing for a period of time and to locate and apply the sterilizing agent. If the blade must be sterilized multiple times throughout the working period, this can cause delays and be inefficient for the operator. Likewise, if the hand tool must be lubricated in some way during operation or use of the hand tool, the user must stop working, then find and apply the lubricating fluid, leading to delays.

In general, at least one handle of the presently disclosed hand tools is interchangeable. In many, but not all instances, the apparatus includes more than one interchangeable handle. In most instances a single user engages the hand tool in order to operate the tool, though it is possible that multiple users can operate the tool, e.g., in the case of bypass loppers with an extending pole. In at least one instance, the disclosed hand tool can comprise more than one moving part. Such an apparatus could also conceivably comprise a motor or engine to facilitate the user's use of the hand tool. Hand tools with such an interchangeable handle as presently described can be any of the type described and can be used in any of the manners, applications, industries, uses, forms or examples without limitation.

Hand tools with at least one interchangeable handle include but are not limited to garden forks, secateurs, rakes, hammers, sledge hammers, spanners, pliers, screwdrivers, chisels, wrenches, pliers, needle-nose pliers, cutters, striking tools, struck or hammered tools, screwdrivers, vises, clamps, snips, saws, folding saws, bow saws, pruning saws, scabbards, drills, knives, putty knives, taping knives, palette knives, balisongs, bowie knives, bushcraft knives, camping knives, kirambits, cobbler's knives, crooked knives, diver's knives, electrician's knives, hunting knives, kiridashis, linoleum knives, palette knives, rigging knives, scalpels, utility knives, X-Acto knives, shovels, trowels, pointing trowels, bricklayer's trowels, float trowels, notched trowels, margin trowels, garden trowels, cathole trowels, gauging trowels, snow shovels, spoon shovels, square shovels, folding shovels, planting tools, transplanters, grappling-type shovels, scoops, scissors, shears, axes, felling axes, splitting axes, broad axes, adzes, hatchets, carpenters axes, hand axes, mortising axes, double bit axes, crash axes, lathe hammers, ball peen hammers, mallets, mattocks, pickaxes, pulaskis, slater's axes, mauls, splitting mauls, chopping bush axes, versa-picks, tomahawks, sportsman's axes, camp axes, cutter mattocks, landscape axes, double bit Michigan axes, single bit Michigan axes, riggers L axes, hookaroons, engineer's hammers, picks, shingler's L hatchets, bagging hooks, billhooks, grain cradles, harpes, khopeshs, aruvals, Kaiser blades, sling blades, grass hooks, reap hooks, staff hooks, sickles, machetes, pitchforks, spades, scythes, hoes, draw hoes, scuffle hoes, flower hoes, Dutch hoes, Paxton hoes, hoedads, mortar hoes, hoop hoes, collinear hoes, Swoe hoes, wheel hoes, horse hoes, forks, garden forks, spading forks, digging forks, bedding forks, manure forks, thatch rakes, weeders, cultivators, hoe/cultivator combo tools, gooseneck mortar hoes, stand-up garden tillers, soil scoops, 2-prong weeder hoes, landscaping edgers, spike aerators, dual wheel rotary edgers, clearing hooks, hedge shears, shears, grass shears, pruning snips, garden scissors, floral cutters, micro snips, topiary shears, anvil head pruners, dual cut pruners, ratchet pruners, oval handled snips, precision snips, pruning saws, spring assist shears, curved blade snips, anvil ratchet loppers, graips, clam hoes, Adze hoes, paculs, forks, rakes, leaf rakes, braces, grass shears, loppers, small bypass loppers, large bypass loppers, long reach pruners, bypass hand pruners, anvil pruning shears, averruncators, daisy grubbers, dibbers, post hole diggers, riddles, any other cutting tools, any other edged tools, any other shearing tools, any other contacting tools, any other rotating tools, any other digging tools, any other tools known to one of ordinary skill in the art of hand tools, and any combination thereof. The hand tool can be a garden implement.

FIGS. 1A-1L show various views of a hand tool 10 (also "garden implement 10"), comprising a contacting element 110 having a first blade 112a (or "a first tip 112a") and a second blade 112b (or "a second tip 112b") (together, "blades 112" or "tips 112") and a first shaft 114a and a second shaft 114b (together, "shafts 114"). As shown, the first blade 112a and the second blade 112b can be by-pass blades, meaning that the blades 112 move past one another during use of the hand tool 10. Other configurations are possible; for example, blade movement may be terminated when the blades contact one another. Some hand tools do not have blades. Some hand tools have other contacting elements such as a hammering surface, a sawing or slicing blade, a digging wedge, etc.

The hand tool 10 can further have a hole 120 (shown in FIG. 1C) in the blades 112, into which is fitted a bolt or pin 122. The bolt 122 can have a threaded portion and can be retained within the hole 120 using a nut 124 that is also threaded and which engages the bolt 122 at the threaded portion. The bolt 122 can define an axis 121 (or "axis of rotation 121") about which the blades 112 rotate when the user actuates the hand tool 10 open and closed. The axis of rotation 121 can alternatively be defined by a rivet or pin or other such component. As shown, the hand tool 10 represents two counterpoised levers rotating about the axis of rotation 121. Other configurations are possible whereby two or more axes of rotation exist. Other hand tools may not have an axis of rotation, such as for a trowel which does experience the same type of rotational motion experienced by shears. Other hand tools may have an axis of rotation that is external to the hand tool. For instance, the axis of rotation for a hammer may be the user's elbow since the rotational motion of the hammer is about the user's elbow. In other instances, the axis of rotation is the user's shoulder for a similar reason.

The hand tool 10 can further comprise a first arm 130 (or "first handle shaft 130") having a first end 132 and a second end 134. The first arm 130 is connected to the first blade 112a. The hand tool 10 can further comprise a second arm 140 (or "second handle shaft 140") having a first end 142 and a second end 144. The second arm 140 is connected to the second blade 112b. The first arm 130 can also be attached to the second blade 112b and likewise the second arm 140 can be attached to the first blade 112a. The hand tool 10 can further comprise a spring 148 disposed between and connected to the first arm 130 and the second arm 140 at an anchor point 136 on the first arm 130 and an anchor point 146 on the second arm 140. The spring 148 can be disposed between the first arm 130 and second arm 140 such that the spring 148 applies force against both the first arm 130 and second arm 140, biasing the contacting element 110 of the hand tool 10 to maintain an open configuration. The spring 148 can also be configured to bias the contacting element 110 of the hand tool 10 to maintain a first (open) configuration.

Figure 1C:
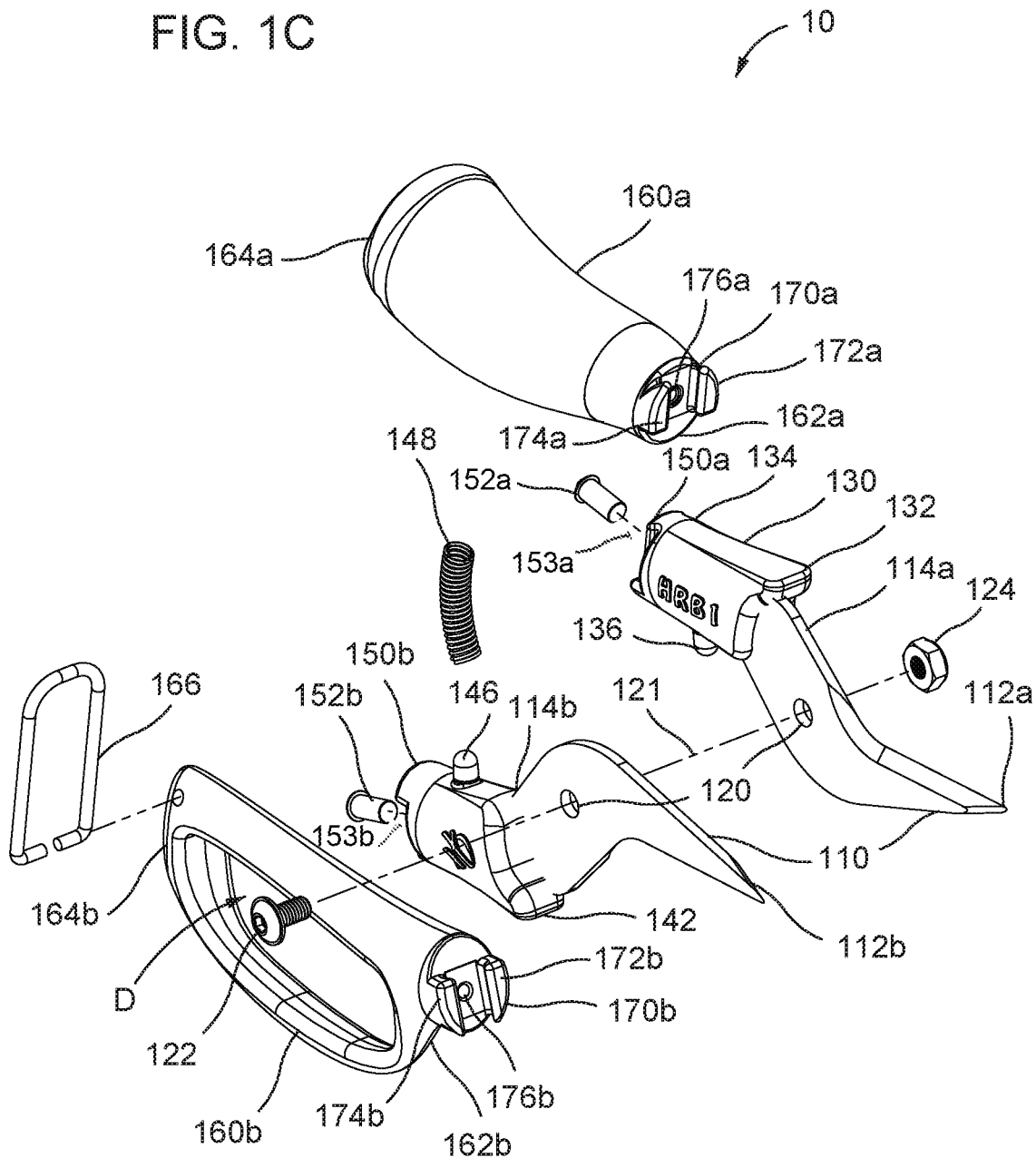
FIG. 1C is an exploded view of the hand tool with interchangeable handles of FIGS. 1A and 1B.
Figure 1D:
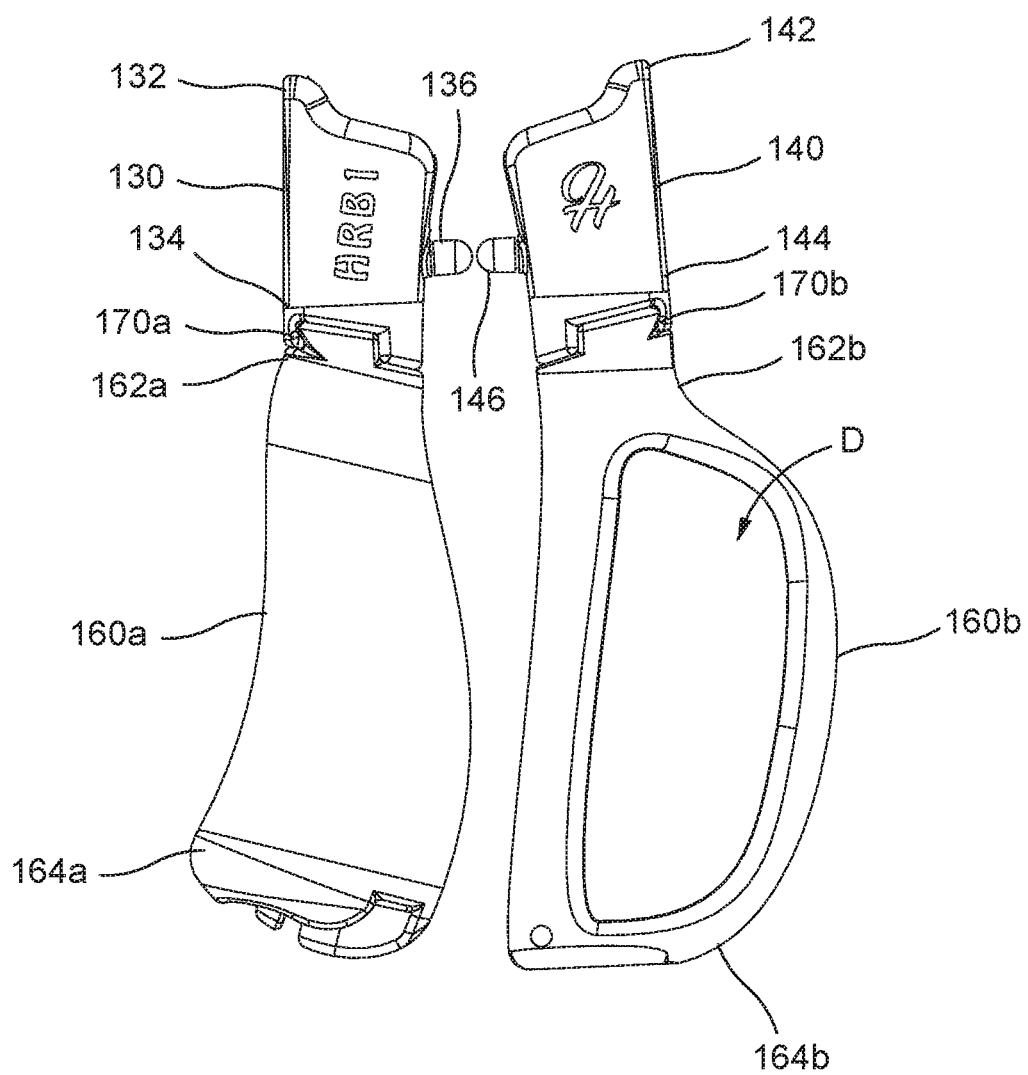
FIG. 1D is a plan view of a first arm, a second arm, a first interchangeable handle, and a second interchangeable handle of the hand tool of FIGS. 1A-1C.
Figure 1E:
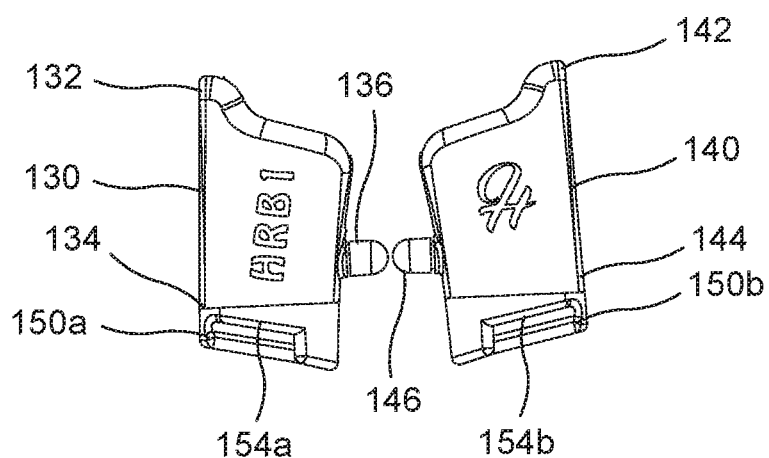
FIG. 1E is a plan view of the first arm and the second arm of the hand tool of FIGS. 1A-1D.
Figure 1F:
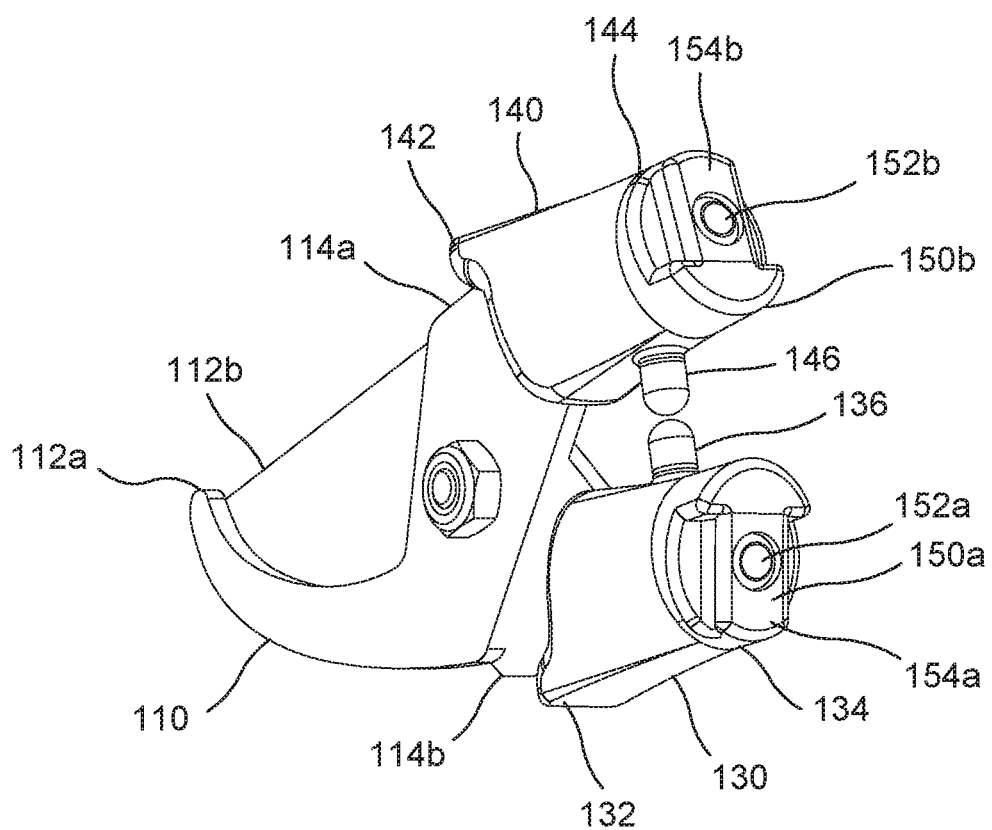
FIG. 1F is a perspective view of the first arm and the second arm connected to a contact element (the hand tool of FIGS. 1A-1E without handles attached).
Figure 1G:
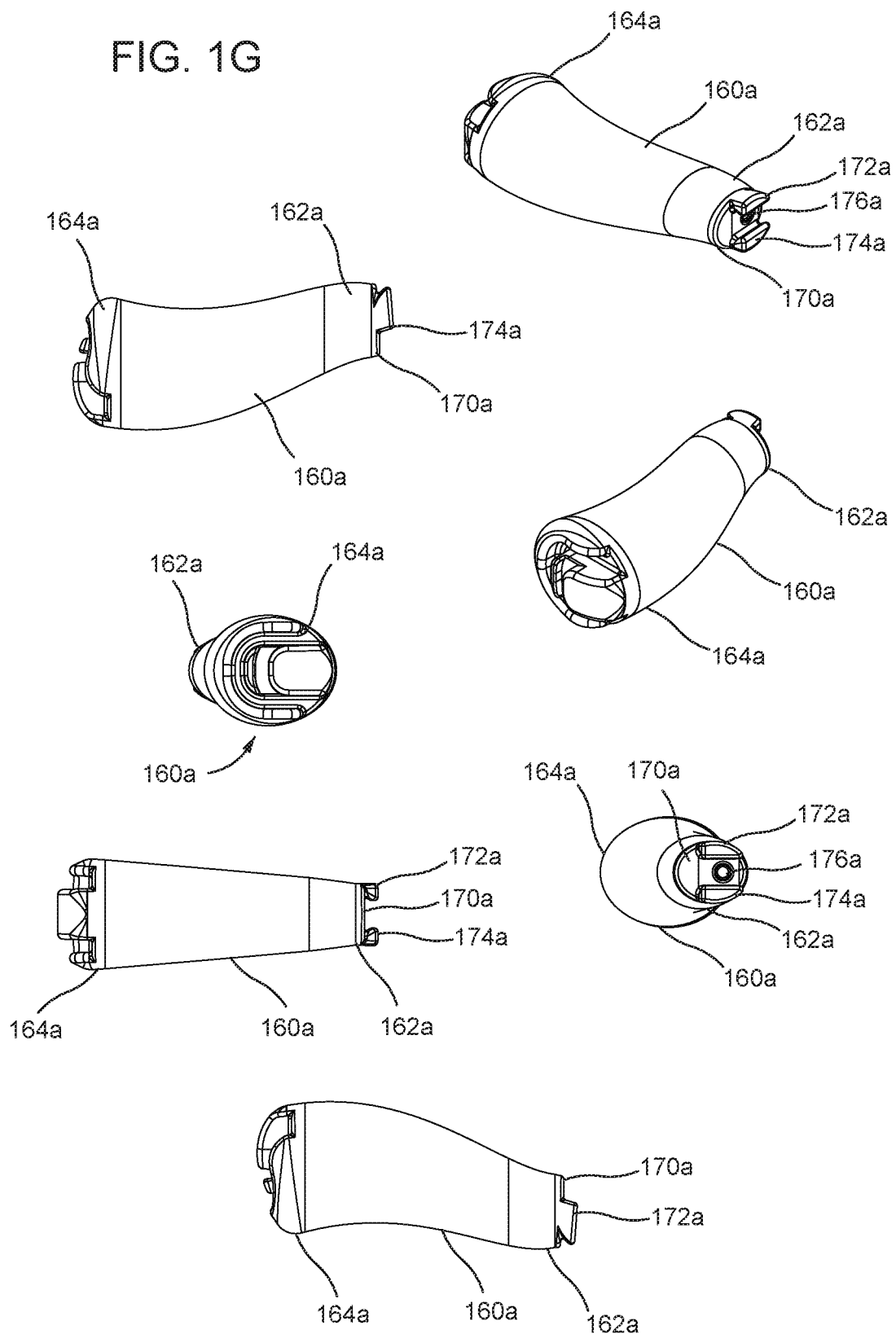
FIG. 1G is a series of perspective views of the first interchangeable handle.
Figure 1H:
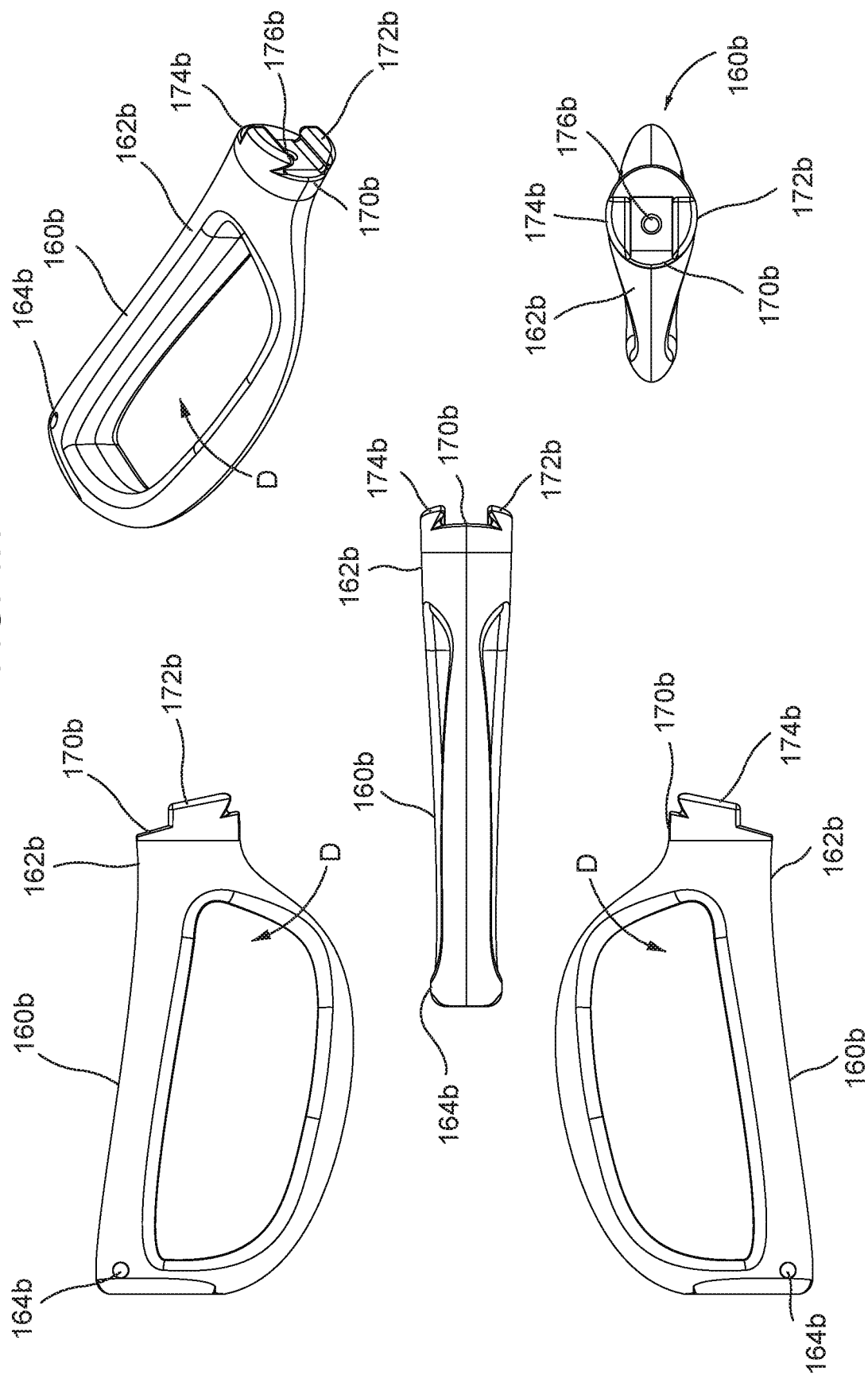
FIG. 1H is a series of perspective views of the second interchangeable handle.
Figure 1J:
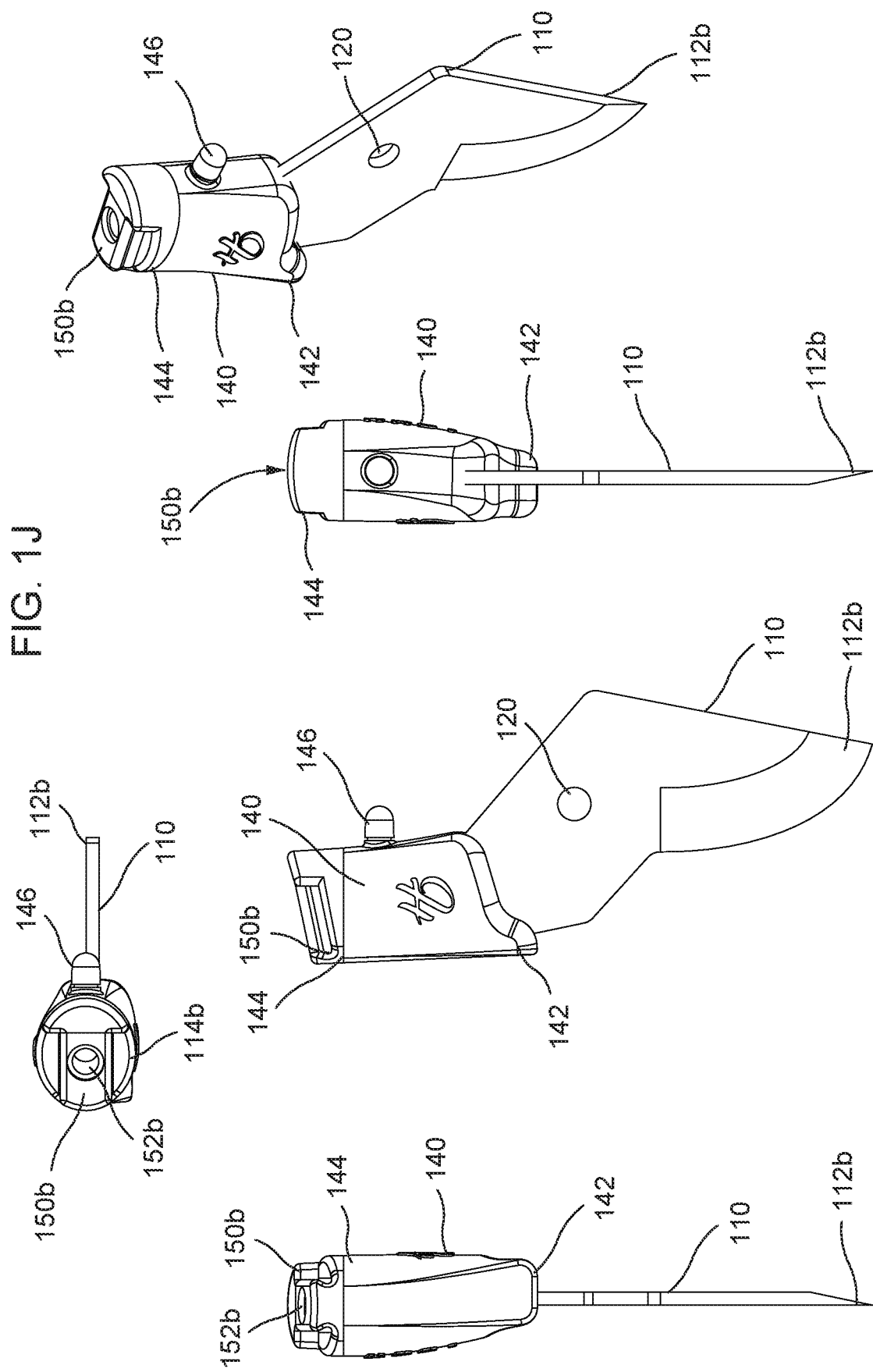
FIG. 1J is a series of perspective views of a second piece of the contact element and the second arm.

The hand tool 10 also includes components that make it possible to attach and detach handles 160a and 160b by hand, without using any tools. More specifically, the first end 134 of the first arm 130 defines a ridge 150a. The second end 144 of the second arm 140 defines a ridge 150b. The ridge 150a and the ridge 150b are collectively "ridges 150". The hand tool 10 can further comprise a first detent 152a (or "first spring-loaded detent 152a"), as shown in FIG. 1C, disposed within and protruding from the first ridge 150a when in a relaxed state. The hand tool 10 can further comprise a second detent 152b (or "second spring-loaded detent 152b"), as shown in FIG. 1C, disposed within and protruding from the second ridge 150b. The first detent 152a and the second detent 152b can collectively be "detents 152" or "spring-loaded detents 152".

The hand tool 10 can further comprise a first interchangeable handle 160a (or "first detachable handle 160a") connected to the first arm 130. The hand tool 10 can further comprise a second interchangeable handle 160b (or "second detachable handle 160b") connected to the second arm 140.

Alternatively, the first interchangeable handle 160a can be connected to the second arm 140 while the second interchangeable handle 160b can be connected to the first arm 130. The first interchangeable handle 160a and the second interchangeable handle 160b are collectively "interchangeable handles 160" or "detachable handles 160". The first interchangeable handle 160a can have a first end 162a and a second end 164a. The second interchangeable handle 160b can have a first end 162b and a second end 164b. The first end 162a and the first end 162b are collectively "first ends 162". The second end 164a and the second end 164b are collectively "second ends 164".

The first end 162a can define a channel 170a comprising a first wall 172a and a second wall 174a. The first end 162b can define a channel 170b comprising a first wall 172b and a second wall 174b. The first end 162a and the first end 162b are collectively "first ends 162". The channel 170a and the channel 170b are collectively "channels 170". The first wall 172a and the first wall 172b are collectively "first walls 172". The second wall 164a and the second wall 164b are collectively "second walls 164".

A user can connect the interchangeable handles 160 to the first arm 130 and second arm 140 by sliding the ridges 150 on the first and second arms 130, 140 into the channels 170 in the interchangeable handles 160 until the detents 152 click into place, securing the interchangeable handles 160 to the first arm 130 and second arm 140. In particular, the channel 170 can be dimensioned and configured to releasably receive the ridge 150. The ridge 150 can be slidably disposed into the channel 170 to operably engage the interchangeable handle 160 with the first arm 132 and/or the second arm 142. The channel 170 can further comprise a depression 176 (or "concavity 176") configured to receive the detent 152. The depression 176 can receive the detent 152, allowing the ridge 150 to be releasably locked within the channel 170. The second interchangeable handle 160b can further comprise a retaining clip 166, dimensioned and configured to engage the first interchangeable handle 160a such that the hand tool 10 maintains a second (closed) configuration.

Interchangeable handles 160 can be taken off by applying pressure in an upwards and outwards motion. By doing so, the detent 152 is disengaged (exits depression 176) and allows removal of the interchangeable handle 160. When the detent 152 comes into contact with the edge of the depression 176 and force is applied, the detent 152 disengages and allows the ridge 150 to slide out of the channel 170 in the interchangeable handle 160. In other words, when operating a hand tool, the users thumb applies pressure on the first interchangeable handle 160a downwards and the users other fingers apply pressure upwards on the second interchangeable handle 160b to operate the hand tool (e.g., to make a cut). To take the interchangeable handles 160 off, the ridge 150 exits the channel 170 in the opposite direction, meaning the first interchangeable handle 160a for the users thumb is removed by applying pressure upwards and the second interchangeable handle 160b is removed by applying pressure downwards.

Referring again to the bolt or pin 122, the pin 122 defines a first axis about which the first blade 112a rotates. The first handle shaft 130 extends from the first blade 112a and defines the first ridge 150a along a second axis perpendicular to the first axis 121. The first spring-loaded detent 152a is oriented along a third axis perpendicular to the first and second axes and protrudes partway from the first ridge 150a when in a relaxed state. Similarly, the second blade 112b rotates about the first axis 121, and the handle shaft 140 defines the second ridge 150b along the second axis. The second spring-loaded detent 152b is oriented along the third axis and protrudes partway from the second ridge 150b when in a relaxed state.

In FIGS. 1A-1D, the first interchangeable handle 160a is shown as being connected to the first arm 130 and the second interchangeable handle 160b is shown as being connected to the second arm 140, however, the alternative configuration is also possible. For instance, it is possible that the first interchangeable handle 160a, the second interchangeable handle 160b, and/or the first and second interchangeable handles 160 together cause the hand tool 10 to be well suited for a right-handed user. In such a case, it may be helpful to be able to connect the first interchangeable handle 160a to the second arm 140 and the second interchangeable handle 160b to the first arm 130—e.g., without a wrench, screwdriver, or other tool—in order to configure the hand tool 10 to be well suited for a left-handed user. Other circumstances and configurations are also possible wherein differently configured or dimensioned interchangeable handles 160 would be connected to either of the first arm 130 or second arm 140.

Other hand tools can also comprise less than all subcomponents described above. For instance, the apparatus could comprise a contacting element 110, a first arm 130 having a tip 132 and a shaft 134, the shaft 134 defining a ridge 150, the ridge 150 comprising a detent 152, an interchangeable handle 160 with a first end 162 defining a channel 170 configured to receive the ridge 150 and comprising a first wall 172, a second wall 174, and a depression 176, the depression 176 configured to receive the detent 152.

The contacting element 110, arms 130, 140, bolt 122, nut 124, spring 148, detent 152, ridge 150, channel 170, depression 176, interchangeable handle 160, retaining clip 166, detent spring, and other components of the apparatus can be made from any sufficiently hard and/or durable material, including but not limited to steel, stainless steel, carbon fiber, chrome, platinum, palladium, iron, tin, copper, aluminum, nickel alloy, aluminum-cobalt alloy, manganese-aluminum-silicon alloy, chromium-iron-rare earth metal alloys, bronze-copper alloy, iron alloy, copper-zinc alloy, gold, silver, indium, gallium, pig iron, cast iron, magnesium, any other suitable metal or metal alloy, or any combination thereof.

The interchangeable handles 160 can be made from any material with sufficient tensile strength, compressive strength, shear strength, and which is not brittle, thermoplastic, or plastic under a normal magnitude of deforming stress, for instance, the deforming stress resulting from less than about 200 Mpa of force. Such materials can include but are not limited to polymers, biopolymers, an epoxy resin, an epoxy resin reinforced by carbon fibers, an epoxy resin reinforced by carbon nanotubes, highly anisotropic material having strength in the longitudinal direction of the fibers and elasticity in the transverse, natural rubber, synthetic rubber, polyethylene terephthalate, polypropylene, cellulose-based material, composites, laminates, elastic materials, shape memory materials, a hydrogel, a polyester, a biopolyester, woven elastic material, acrylonitrile butadiene styrene (ABS), polycarbonate, polycarbonate/ABS alloy, ABS/polyvinylchloride (PVC), acetal copolymer, acrylic, polytetrafluoroethylene, ethylene vinyl alcohol (EVOH), any other suitable organic or inorganic material, and any combination thereof. A cushioned grip can be disposed on the outside of the interchangeable handle 160.

Whereas the first arm 130 and/or the second arm 140 shown in FIGS. 1A-1I define or comprise a ridge 150, the first arm 130 and/or the second arm 140 can also define or comprise a channel 170. Similarly, whereas the interchangeable handles 160 as disclosed herein may define or comprise a channel 170, the interchangeable handles 160 can also define or comprise a ridge 150. The first arm 130 and/or the second arm 140 can define or comprise more than one ridge 150 and/or more than one channel 170. The interchangeable handle 160 can define or comprise more than one ridge 150 and/or more than one channel 170. The first interchangeable handle 160a and second interchangeable handle 160b can collectively be "interchangeable handles 160". The first end 162a of the first interchangeable handle 160a and the first end 162b of the second interchangeable handle 160b can collectively be "first ends 162". The first channel 170a of the first end 162a of the first interchangeable handle 160a and the second channel 170b of the first end 162b of the second interchangeable handle 160b can collectively be "channels 170".

The ridge 150 can be dimensioned and configured to be slidably disposed within the channel 170. The ridge 150 can be slidably disposed within the channel 170 such that the ridge 150 is locked within the channel 170 during operation of the hand tool 10. The ridge 150 can be lockably disposed within the channel 170 by the orientation of the ridge 150 and channel 170 sliding connection relative to the direction or directions of force applied to the interchangeable handle 160 during use of the hand tool 10. By way of example only, the ridge 150 can slide into the channel 170 at approximately a 90° angle relative to the direction of force applied by the user to the interchangeable handle 160 when manipulating the hand tool 10 from the open configuration to the closed configuration.

In order for the use of interchangeable handles 160 with hand tools 10 to improve the user experience, reduce time delays, prevent hand injuries, and the other benefits described herein, the connection between the interchangeable handles 160 and the arms 130, 140 should be relatively easily releasable. The connection formed between the arms 130, 140 and interchangeable handles 160 when the ridge 150 is slidably disposed within the channel 170 is a toollessly releasable connection. This connection may also be both a toollessly locking connection and a toollessly releasable connection. In other words, the user can attach and lock the interchangeable handles 160 to the arms 130, 140 without the use of additional instruments, tools, or equipment.

In order to prevent the interchangeable handles 160 from unintentionally disconnecting from the arms 130, 140, the ridge 150 can be lockably disposed within the channel 170. The channel 170 can further comprise a stop (not shown), such as a third wall or other barrier positioned at one end of the channel 170 and attached to the first wall 172 and second wall 174. The stop arrests the ridge 150 at a precise point as it is slidably disposed within the channel 170. The stop can be positioned at the end of the channel 170 coinciding with the direction of force applied by the user when manipulating the hand tool 10 from the open configuration to the closed configuration. In such a way, the forcible closure of the arms 130, 140 and the controlled opening of the arms 130, 140 due to release of user-applied force and the force exerted by the spring 148 on the arms 130, 140 can result in the ridge 150 remaining disposed within the channel 170, for example, during use of the hand tool 10, and not sliding out unintentionally.

The interchangeable handles 160 can be lockably connected to the arms 130, 140 in other ways. For example, the channel 170 and ridge 150 can be dimensioned such that the user must apply some amount of force to slide the ridge 150 within the channel 170. In such a case, the ridge 150 can be dimensioned such that the positive volume occupied by the ridge 150 is slightly larger than the negative space defined by the channel 170 so that the channel 170 squeezes the ridge 150, holding it in place. Likewise, removal of a ridge 150 from a channel 170 can involve some amount of applied force to overcome the static friction caused by this squeezing force. In other words, the user (intentionally) applies force to the interchangeable handles 160 in the direction opposite to the direction in which the ridge 150 was slid into the channel 170 in order to disconnect the interchangeable handle 160 from the arms 130, 140.

The dimensions of the ridge 150 and channel 170 can also contribute to the manner in which the interchangeable handles 160 are lockably connected to the arms 130, 140. The channel 170 can have walls that are convex. The channel 170 can have walls that are concave. The channel 170 can have walls that are dimpled, roughened, or otherwise textured so as to provide for a resistive force and/or a larger coefficient of friction when the ridge 150 is disposed at least partially within the channel 170. Similarly, the detent 152 may push against a groove or indentation in the channel 170 to hold the handle 160 in place.

The ridge 150 can be lockably disposed within the channel 170 through the use of a locking mechanism or other engaging device of any kind, dimensions, configuration, or position within the hand tool 10. A locking pin (not shown) can be used to retain the ridge 150 within the channel 170. A locking sleeve (not shown) and/or securing collar (not shown) can be used to retain the ridge 150 within the channel 170. Other possible locking mechanisms or engaging devices can be a clamp, a clasp, a wrap, a retractable sheath, a locking lever, a spring-loaded locking lever, and other such devices.

As explained briefly above, the ridge 150 can also be lockably disposed within the channel 170 through the use of a detent, for example, the spring-loaded detent 152 in FIG. 1C. The detent 152 can be positioned within the ridge 150 and can be configured to be disposed within the depression 176, which is within the channel 170, as the ridge 150 slides into the channel 170. Once the detent 152 and the depression 176 are properly aligned, the detent 152 pops into the depression 176 such that the interchangeable handle 160 is lockably connected to the first arm 130 or the second arm 140 during use of the hand tool 10. The lockable connection between the interchangeable handle 160 and the first arm 130 or the second arm 140 can be further facilitated through the use of extents, as described above, positioned at the end of the channel 170 in the direction or directions of force applied by the user during manipulation of the hand tool 10 between the open configuration and the closed configuration. The detent 152 and depression 176 connection can further comprise a release (not shown) that the user engages to reduce or remove the pressure exerted by the spring 153a on the detent 152a, and/or to reduce or remove the pressure exerted by the spring 153b on the detent 152b, as shown in FIG. 1C. The release of the pressure on the detent causes the detent 152 to withdraw from the depression 176, allowing the ridge 150 to slidably disconnect from the channel 170.

The detent 152 can be withdrawn from the depression 176 through the use of lateral applied force, such as from the user applying force to the interchangeable handle 160 in the direction parallel to the channel 170 but opposite the stop. The stop here can be a third wall or other barrier positioned at one end of the channel 170, against which the ridge 150 comes to rest after being slidably disposed to the channel 170. Lateral force applied by the user to the interchangeable handle 160 against a detent 152 fixed in an aperture in the ridge 150 can be converted to force applied against the uncompressed spring beneath the detent 152, causing the spring to compress and depressing the detent 152 within the ridge 150, allowing the ridge 150 to slidably disengage from the channel 170.

The detent 152 can be augmented or replaced by a locking tab (not shown) or other protuberance in a first extended conformation and made from a sufficiently elastically deformable material such that lateral applied force results in enough deformation of the locking tab to cause the locking tab to change to a second conformation and to withdraw from the depression 176, allowing the ridge 150 to slidably withdraw from the channel 170. After the ridge 150 is withdrawn from the channel 170, the sufficiently elastically deformable locking tab can revert from the second conformation to the first conformation. The elastic locking tab can be repeatedly deformed as descried without the deformation causing inelastic strain or irreversible deformation. Some example hand tools may have a plurality of locking tabs that elastically engage each with at least one other. For instance, there may be a first locking tab disposed on the ridge 150 and a second locking tab disposed within the channel 170 such that when the ridge 150 is disposed within the channel 170, the locking tabs slide past one another and engage to hold the ridge 150 within the channel 170.

In FIGS. 1A-1J, the detent 152 is shown to be contained within and/or protruding from the ridge 150 while the depression 176 is shown to be defined within the channel 176, however the alternative configuration is also possible. The interchangeable handle 160 can be configured to define an aperture, such as with the D-shaped grip D in FIGS. 1A-1D and 1H, to facilitate a comfortable grip for the user and to protect the user's fingers and hands from unwanted or injuring phalangeal contact during use of the hand tool 10. The interchangeable handle 160 can be configured or customized to fit a user's hand.

Figure 1L:
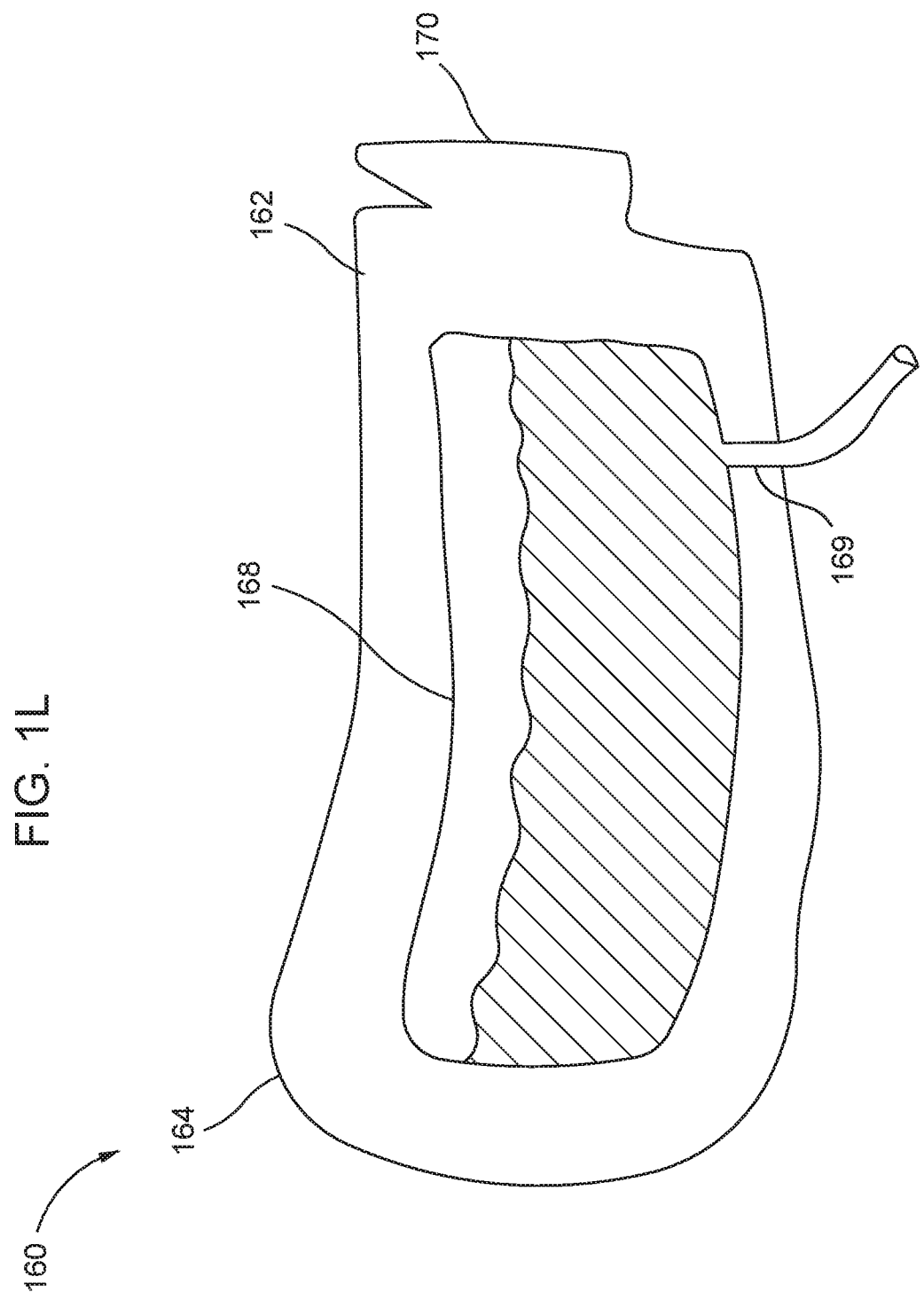
FIG. 1L shows an interchangeable handle defining a cavity connected to a tube.

In FIGS. 1K and 1L, the interchangeable handle 160 can also be configured to define an inner volume, cavity, or reservoir 168 that contains a replenishing supply of a lubricating fluid or a sterilizing agent such as antibacterial fluid, antimicrobial fluid, antiviral fluid, or other sterilizing agents. The lubricating liquid can be discharged from the inner volume 168 on demand, e.g., to lubricate the interface between the hole 120 and the bolt 122 to increase the ease with which a user can manipulate the hand tool 10 between the open configuration and the closed configuration due to a lower coefficient of friction at the axis of rotation 121. The sterilizing agent can be discharged from the inner volume 168 on demand, e.g., to sterilize the contacting element 110 before, during, or after use of the hand tool 10. The replenishing supply of a fluid can be discharged from the inner volume 168 through the use of hydraulic pressure within the inner volume 168, deformation of the interchangeable handle 160 causing a reduction in the dimensions of the inner volume 168, a user-operated pumping device, gravitational force, capillary action, or any other appropriate cause, mechanism, or device.

The replenishing supply of a fluid can be caused to discharged from the inner volume 168 through a tube 169 or other fluid communication device. The tube 169 can protrude from the interchangeable handle 160 and removably connect to another point of the device, enabling fluid communication, as shown in FIG. 1L. The tube 169 can remain internal to the interchangeable handle 160, protruding from the first end 162 of the interchangeable handle 160 and connecting removably to a second tube (not shown) protruding from the first or second arm 130, 140. The tube 169 can likewise terminate at a surface of the channel 170. A receiving tube (not shown) can terminate at a surface of the ridge 150. When the ridge 150 is slidably disposed within the channel 170 until the ridge 150 abuts the stop, the tube 169 and receiving tube can be aligned, allowing for fluid communication between the inner volume 168 and the receiving tube within the ridge 150.

The hand tool 10 can comprise templatized or genericized ridges 150 such that the interchangeable handle 160, comprising templatized or genericized channels 170, of any particular configuration can be exchanged for any other interchangeable handle 170 of any configuration, including but not limited to those disclosed herein. Similarly, the interchangeable handles 160 can comprise templatized or genericized channels 170, of any particular configuration, such that the interchangeable handles 160 can be removably attached to any other hand tool 10 at the first arm 130 and/or second arm 140, the arms comprising templatized or genericized ridges.

Figure 2A:
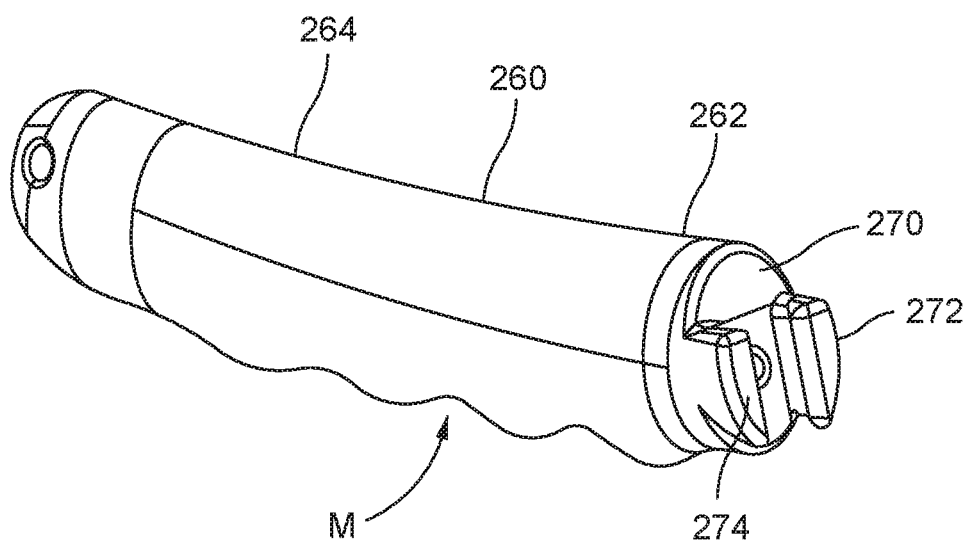
FIGS. 2A and 2B show an interchangeable handle with molded finger grips.
Figure 2B:
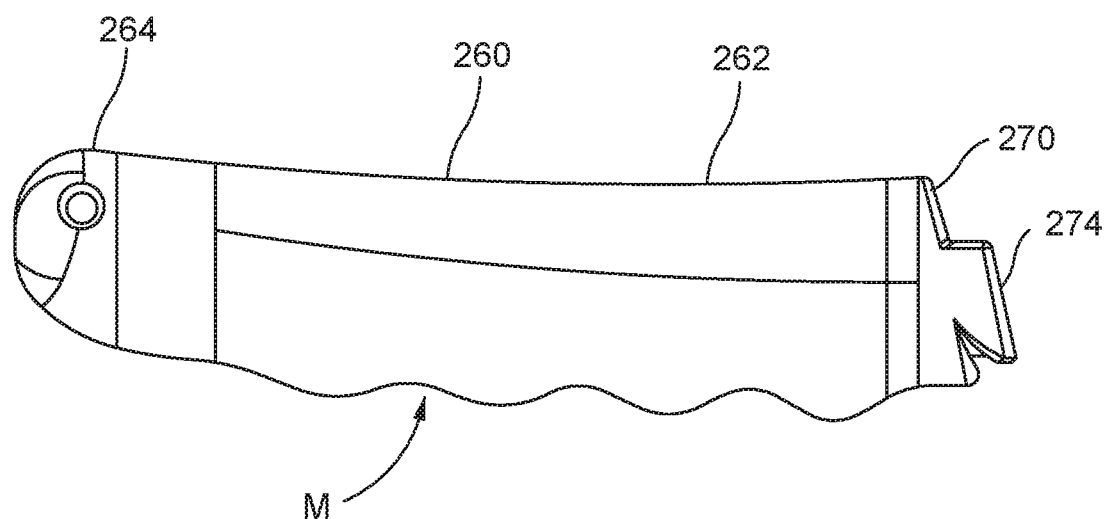
Figure 3B:
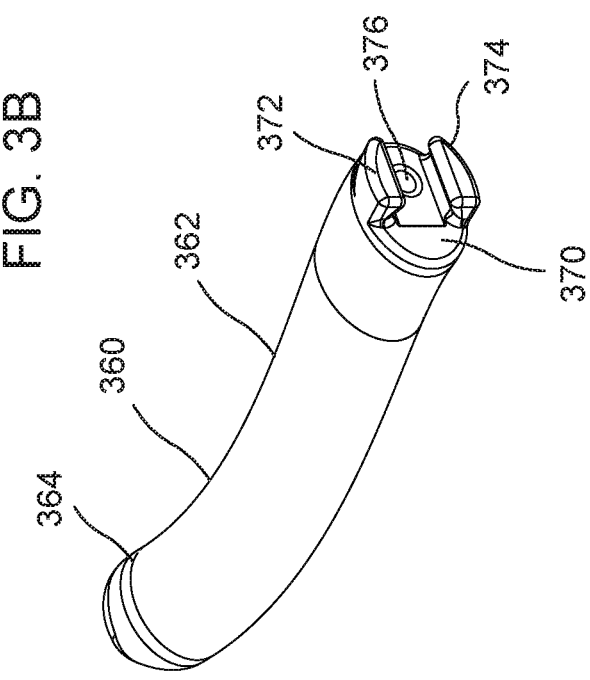
FIGS. 3A-3D show a C-shaped interchangeable handle.
Figure 3A:
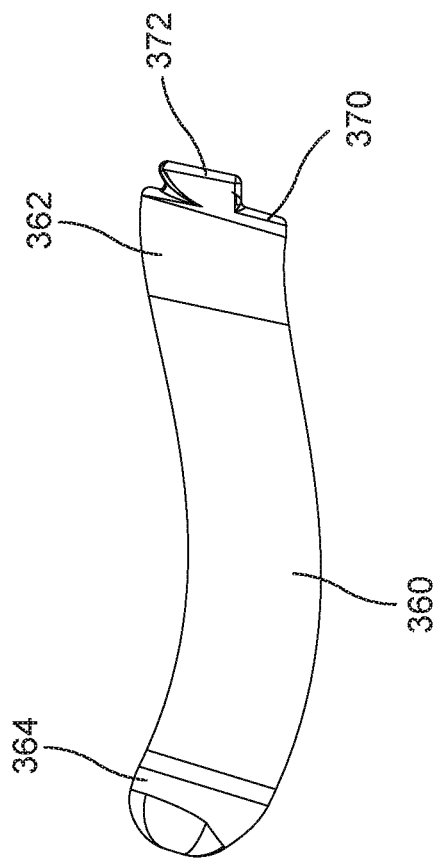
Figure 3D:
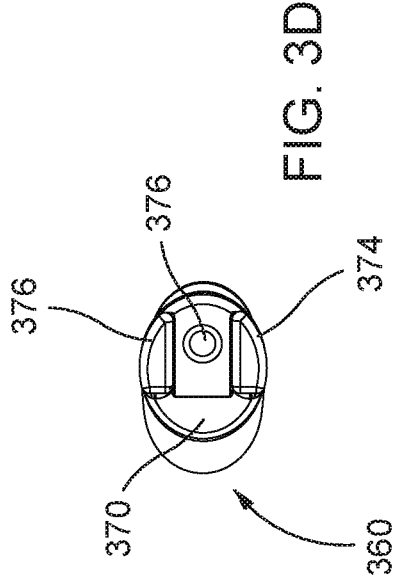
Figure 3C:
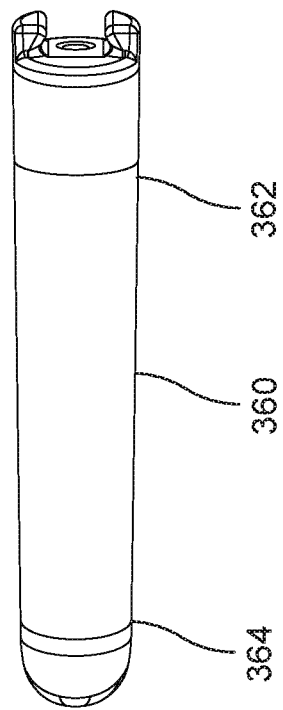

FIGS. 2A and 2B show an interchangeable handle 260 for a hand tool. The interchangeable handles 260 are dimensioned and configured to releasably connect to the hand tool in order to enable a user to perform a function with the hand tool. Portions and/or aspects of the interchangeable handle 260 can be substantially similar in form and/or function to the corresponding portions and/or aspects of the interchangeable handle 160 described above with reference to FIGS. 1A-1L.

FIGS. 2A and 2B show an alternative configuration of an interchangeable handle 260 for a hand tool 20, having a first end 262 and a second end 264. The first end 262 of the interchangeable handle 260 defines a channel 270 dimensioned and configured to slidably engage with a ridge (not shown) on a first arm (not shown) or a second arm (not shown) of a suitable handle tool. In this alternative configuration, the interchangeable handle 260 has a molded grip M. This molded grip M can be customized—that is, it can be dimensioned and configured for a particular user. The molded grip M can be molded in any particular fashion, including having defined finger grips, having more or less finger grips, having wider or narrower finger grips, including more or less elastically deformable material, a larger or smaller overall diameter, longer or shorter overall handle length, a degree of axial curvature, any other parameters that could be altered to provide a more customized interchangeable handle 260 for a user, and any combination thereof.

FIGS. 3A-3D show an interchangeable handle 360 for a hand tool. The interchangeable handles 360 are dimensioned and configured to releasably connect to the hand tool in order to enable a user to perform a function with the hand tool. Portions and/or aspects of the interchangeable handle 360 can be substantially similar in form and/or function to the corresponding portions and/or aspects of the interchangeable handle 160 described above with reference to FIGS. 1A-1L.

FIGS. 3A-3D shows an alternative configuration of an interchangeable handle 360 for a hand tool 20, having a first end 362 and a second end 364. The first end 362 of the interchangeable handle 360 defines a channel 370 dimensioned and configured to slidably engage with a ridge (not shown) on a first arm (not shown) or a second arm (not shown). In this alternative configuration, the interchangeable handle 360 has a curved grip C. This curved grip C can be dimensioned and configured for a particular user. The curved grip C can be fashioned in any particular way, including having a longer or shorter overall handle length and/or a larger or smaller radius of curvature, can include more or less elastically deformable material, can be larger or smaller radially, and according to many other parameters that could be altered to provide a customized interchangeable handle 360 for a user.

FIGS. 4A-4D show hand tools 42, 44, 46, 48. The hand tools 42, 44, 46, 48 are dimensioned and configured to releasably connect to interchangeable handles 460 in order to enable a user to perform functions with the hand tools 42, 44, 46, 48. Portions and/or aspects of the hand tools 42, 44, 46, 48 and/or interchangeable handle 460 can be substantially similar in form and/or function to the corresponding portions and/or aspects of the hand tool 10 and/or interchangeable handle 160 described above with reference to FIGS. 1A-1L.

FIGS. 4A-4D shows a series of alternative hand tools 40, 42, 44, and 46, comprising one or more interchangeable handles 460. FIG. 4A shows a scissors 40 with interchangeable handles 460. FIG. 4B shows a knife 44 with an interchangeable handle 460. FIG. 4C shows a trowel 46 with an interchangeable handle 460. FIG. 4D shows a saw 48 with an interchangeable handle 460. These alternative hand tools 40, 42, 44, 46 and any other hand tools as disclosed herein can be dimensioned and configured according to any part or parts of the present disclosure.

Figure 5B:
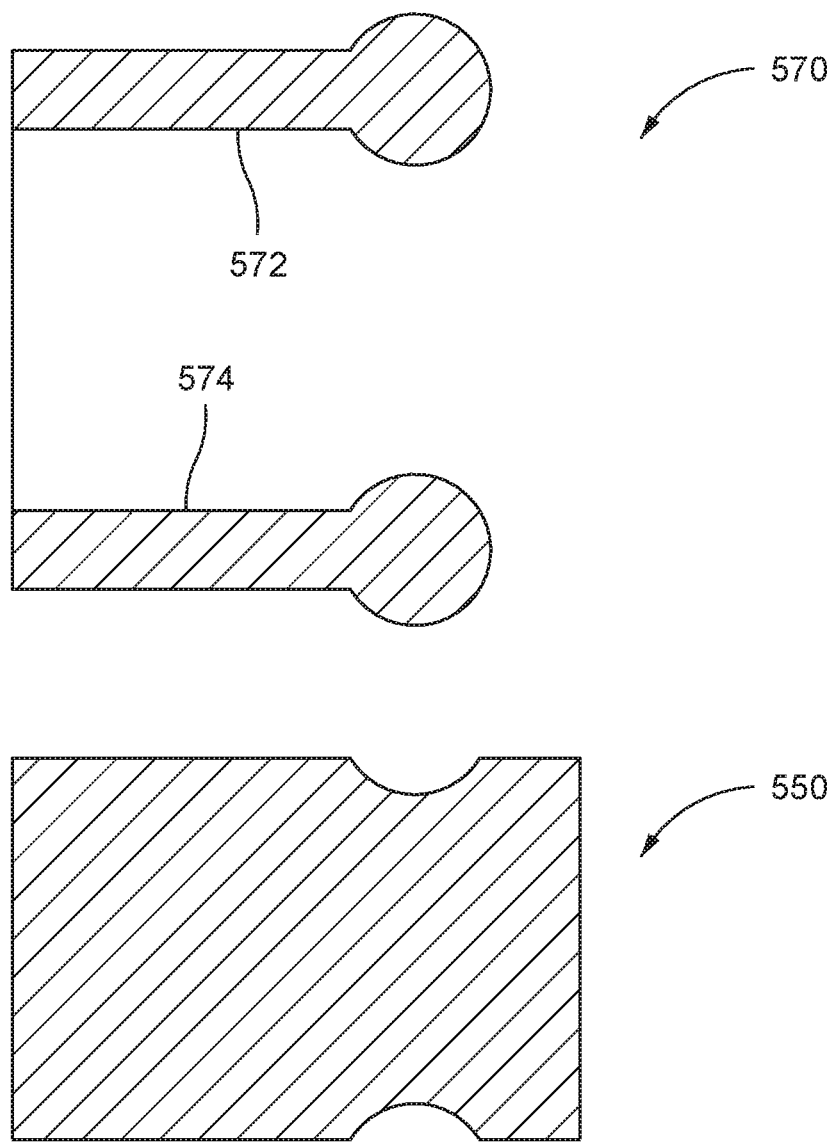
FIG. 5B shows a side view of a ridge and channel for connecting an interchangeable handle to a hand tool.

FIGS. 5A-5C show a ridge 550 and a channel 570 for a hand tool. The ridge 550 and channel 570 are dimensioned and configured to releasably connect interchangeable handles 460 to a hand tool in order to enable a user to perform functions with the hand tool. Portions and/or aspects of the ridge 550 and/or channel 570 can be substantially similar in form and/or function to the corresponding portions and/or aspects of the ridge 150 and/or channel 170 described above with reference to FIGS. 1A-1L.

FIGS. 5A-5C show different possible configurations of ridges and channels for mating/connecting interchangeable handles to the arms of the hand tool. The ridge 550 can have a first wall 572 and a second wall 574. One or both of the first wall 572 and the second wall 574 can be concave. One or both of the first wall 572 and the second wall 574 can be convex. The ridge 550 can be shaped such that the walls 572, 574 of the ridge 550 angle inwards radially at points closer to the interchangeable handle and then angle outwards radially at points closer to the first or second arm, as in FIG. 5A. The ridge 550 can be lobe shaped, as in FIG. 5B. In other words, the ridge 550 can be angled first outwards radially at points closer to the interchangeable handle, forming tabs or lobes that extend beyond the interchangeable handle in the radial direction, and then angle inwards radially at points closer to the arms. The ridge 550 can first angle inward at an acute angle at points closer to the interchangeable handle, then angle back outward at a large oblique angle at points closer to the arms, and then form a flat or curved or notched surface at points closest to the arms, as in FIG. 5C. Likewise, the channel 570 can be formed inversely relative to the dimensions and configuration of the ridge 550. The ridge 550 and channel 570 can be dimensioned and configured in any manner such that the channel 570 partially contains and retains the ridge 550 when the interchangeable handle is attached to the arms, and such that the ridge 550 and channel 570 are spatial transpositions one of the other.

Figure 6A:
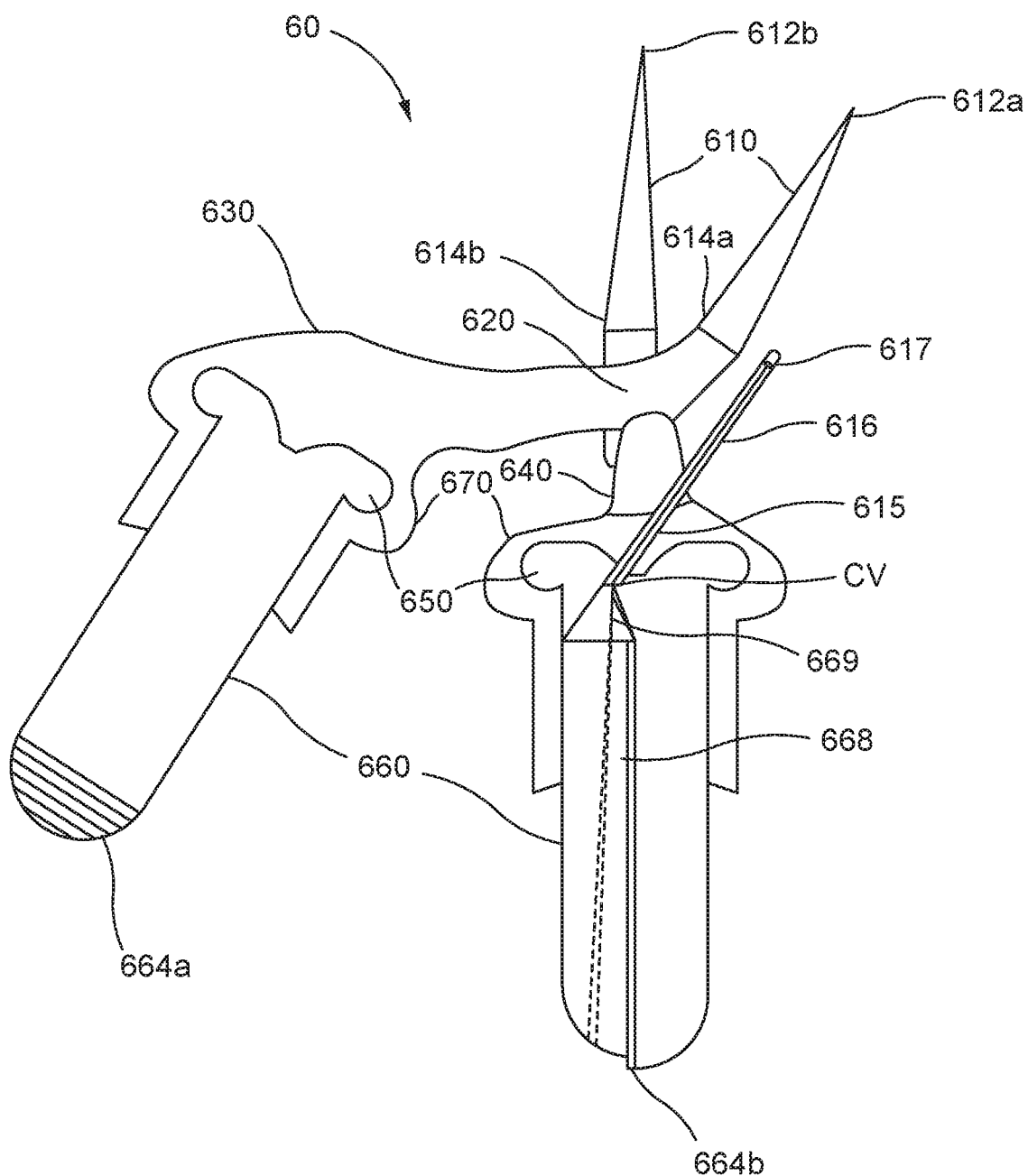
FIG. 6A shows a hand tool having interchangeable handles with a cavity for fluid storage.
Figure 6B:
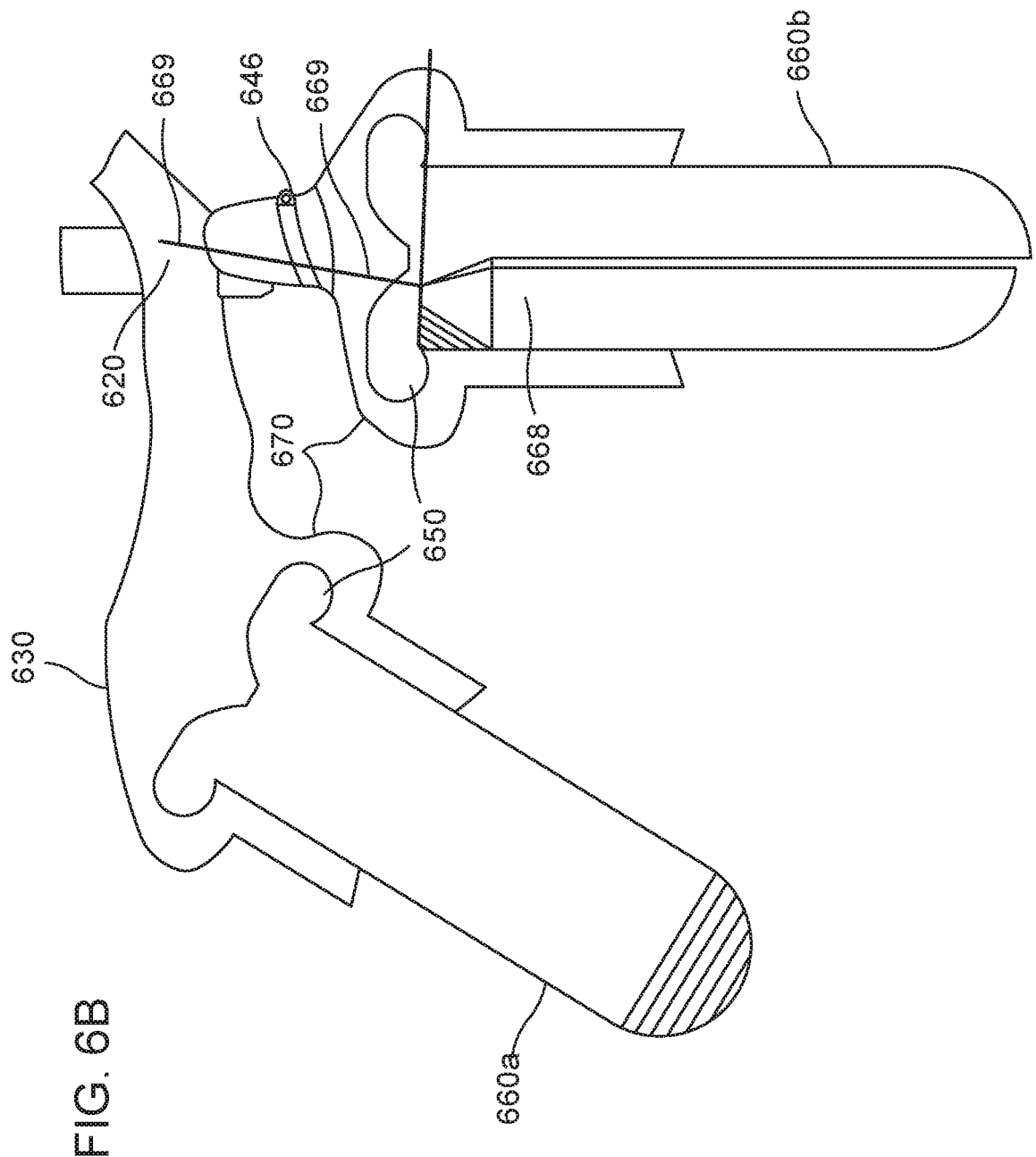
FIG. 6B shows portions of the hand tool of FIG. 6A.

FIGS. 6A-6C show a hand tool 60 or portions thereof. The hand tool 60 are dimensioned and configured to releasably connect to interchangeable handles 660 in order to enable a user to perform functions with the hand tool 60. Portions and/or aspects of the hand tool 60 and/or interchangeable handle 660 can be substantially similar in form and/or function to the corresponding portions and/or aspects of the hand tool 10 and/or interchangeable handle 160 described above with reference to FIGS. 1A-1L.

FIGS. 6A-6C show possible configurations for interchangeable handles 660 that include a cavity for containing a replenishing supply of lubricating and/or sterilizing fluid to other elements of the hand tool 60. The first configuration, shown in FIGS. 6A and 6B, uses gravity-based communication of the replenishing fluid from a cavity 668, through a tube 669, to a fluid replenishing device 616 with a first end 615 and a second end 617. In some instances, the second end 617 is dimensioned and configured to deliver the fluid to a hole 620 partially defining an axis of rotation. The fluid can also be delivered to the contacting element 610, the first end 612a of the first blade, the second end 614a of the first blade, the first end 612b of the second blade, or the second end 614b of the second blade. Gravity communication of the fluid can be controlled by the user through the use of a user-actuated flow control valve CV that maintains a closed configuration unless actuated into an open configuration. The control valve CV impedes flow until the user actuates the control valve CV using a mechanical and/or electrical actuating member. Thereby, the user can invert the hand tool 60 such that at least a portion of the cavity 668 is above the control valve CV and actuate the control valve CV from the closed configuration into the open configuration in order to start the flow of fluid due to gravitational force to a particular feature of the hand tool 60. Subsequently, the user can then actuate the control valve CV from the open configuration into the closed configuration to stop the flow of fluid once sufficient replenishing supply of fluid has been communicated.

FIG. 6C shows a pump that can be used to disperse the replenishing supply of lubricating and/or sterilizing fluid. In particular, the user can compress or depress a lever or button B that actuates a closed chamber CC in a housing H. Other viable methods for dispersal of the replenishing supply of lubricating and/or sterilizing fluid include volume displacement, volume reduction, capillary forces, suction, partial vacuum, the Venturi effect, or combinations thereof.

The cavity 668 for containing the replenishing supply of lubricating and/or sterilizing fluid can be a replaceable fluid container. The replaceable fluid container can be a first container (not shown) that is fully removed and replaced by a second container (not shown). Thereby, the user can replace the first container with the full second container when the first container is substantially empty. The cavity 668 can also be in fluid communication with a reservoir (not shown) or secondary cavity (not shown) that provides additional fluid to replace fluid dispensed from the cavity 668. The reservoir or secondary cavity can be permanently or removably connected to the cavity 668. The reservoir or secondary cavity can be mobile or stationary.

CONCLUSION

To provide an overall understanding, certain illustrative embodiments have been described; however, it will be understood by one of ordinary skill in the art that the systems, apparatuses, and methods described herein can be adapted and modified to provide systems, apparatuses, and methods for other suitable applications and that other additions and modifications can be made without departing from the scope of the systems, apparatuses, and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

One of ordinary skill in the art will recognize that the apparatus disclosed herein can be formed from a single material or multiple materials. The hand tool can also be formed from multiple subcomponents. Any of the subcomponents can be formed from a single material or multiple materials. Any of the subcomponents of the hand tool or the entire hand tool itself can be caused to be formed, caused to be assembled, and/or caused to be both formed and assembled.

As used herein, the term "about" and "approximately" generally mean plus or minus 10% of the value stated, for example about 250 μm would include 225 μm to 275 μm, approximately 1,000 μm would include 900 μm to 1,100 μm.

Conventional terms in the fields of hand tools have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The invention claimed is:

1. A garden implement, comprising:
a first blade;
an arm coupled to the first blade;
a second blade pivotably coupled to the first blade;
a detachable handle configured to be removably coupled to the arm via a locking mechanism including a lengthwise axis and a channel including a concavity, the channel being defined, in part, by a channel wall of the detachable handle that projects from a bottom surface of the channel in a direction parallel with the lengthwise axis, the channel being oriented perpendicularly to the lengthwise axis such that (i) a ridge of the arm is configured to be slidably disposed within the channel in a direction that is perpendicular to the lengthwise axis, and (ii) the arm is releasably coupled to the detachable handle, the detachable handle defining a cavity configured to contain a fluid; a tube having a first end disposed within the cavity and a second end configured to deliver fluid across the first blade when the detachable handle is coupled to the arm; a spring-loaded detent disposed within the ridge, the spring-loaded detent configured to engage a concavity disposed in the channel to resist removal of the detachable handle when the detachable handle is coupled to the arm; and a spring configured to bias the spring-loaded detent toward the concavity in a direction perpendicular to the bottom surface of the channel.

2. The garden implement of claim 1, wherein the detachable handle is configured to be completely detached from the arm without the use of a tool.

3. The garden implement of claim 1, wherein the tube includes a first tube and a second tube, the first tube having the first end and the second tube having the second end, the first tube configured to be reversibly fluidically coupled to the second tube such that when the detachable handle is coupled to the arm, the first tube is fluidically coupled to the second tube.

4. The garden implement of claim 1, wherein the second end of the tube is configured to deliver fluid across at least one of the first blade or the second blade when the detachable handle is coupled to the arm.

5. A garden implement, comprising:
a first blade;
a first arm coupled to the first blade, the first arm defining a ridge;
a second blade pivotably coupled to the first blade;
a second arm coupled to the second blade;
a first detachable handle defining a cavity configured to contain a fluid and defining a first locking mechanism, the first locking mechanism configured to lock the first detachable handle to the first arm and including a lengthwise axis and a channel including a concavity, the channel being defined, in part, by a channel wall of the first detachable handle that projects from a bottom surface of the channel in a direction parallel with the lengthwise axis, the channel being oriented perpendicularly to the lengthwise axis such that (i) the ridge of the first arm is configured to be slidably disposed within the channel in a direction that is perpendicular to the lengthwise axis, and (ii) the first arm is releasably coupled to the first detachable handle;
a spring-loaded detent disposed in the ridge and configured to engage the concavity to inhibit removal of the first detachable handle when the ridge is disposed in the channel;
a first tube having a first end disposed within the cavity and a second end disposed in the channel;
a second tube having an end disposed in the ridge such that when the ridge is disposed in the channel, the first tube is fluidically coupled to the end of the second tube; and
a second detachable handle defining a second locking mechanism configured to lock the second detachable handle to the second arm.

6. The garden implement of claim 5, wherein:
a pin couples the first blade to the second blade and defines an axis of rotation; and
the channel is orthogonal to the axis of rotation.

7. The garden implement of claim 5, wherein the channel has a wedge-shaped cross section.

8. The garden implement of claim 5, wherein the channel wall is a first wall, and the first wall and a second wall, collectively, at least partially define the channel.

9. The garden implement of claim 5, wherein the channel has a concave wall configured to provide a resistive, opposing force to sliding motion of the ridge when the ridge is at least partially disposed in the channel.

10. The garden implement of claim 5, wherein the second locking mechanism includes at least one of a locking pin, a securing collar, a spring-loaded locking lever, or a retractable sheath.

11. The garden implement of claim 5, wherein:
the ridge is a first ridge;
the channel is a first channel;
the concavity is a first concavity;
the spring-loaded detent is a first spring loaded detent;
the second detachable handle has a second channel including a second concavity; and
a second spring-loaded detent projects from a second ridge of the second arm such that the second spring-loaded detent is configured to lockably engage the second concavity.

12. The garden implement of claim 5, further comprising:
a cushioned grip disposed on the outside of the first detachable handle.

13. The garden implement of claim 5, further comprising:
a safety latch configured to reversibly lock the first blade relative to the second blade.

14. The garden implement of claim 5, wherein the first detachable handle is configured to be attached to the first arm via the first locking mechanism and without a tool.

15. The garden implement of claim 5, further comprising a release configured to release the first arm from the first detachable handle, the release configured to withdraw the first spring loaded detent from the first concavity.

16. The garden implement of claim 5, wherein the first detachable handle is configured to be completely removed from the first arm without the use of a tool.

17. The garden implement of claim 5, wherein:
at least a portion of the second tube is disposed within the first arm;
the end of the second tube is a first end of the second tube; and
a second end of the second tube is configured to deliver fluid across the first blade.

18. The garden implement of claim 5, wherein the first tube and the second tube are collectively configured for user-controlled, gravity-based fluid delivery of fluid to a pivotal coupling of the second blade and the first blade.

19. The garden implement of claim 5, wherein the first tube and the second tube are collectively configured for user-controlled, gravity-based fluid delivery of the fluid to at least one of the first blade or the second blade.

20. The garden implement of claim 5, wherein:
at least a portion of the second tube is disposed within the first arm;
the end of the second tube is a first end of the second tube, the garden implement further comprising:
a flow control valve disposed between the first end of the first tube and a second end of the second tube, the flow control valve configured to control flow of fluid from the first end of the first tube to the second end of the second tube.

21. The garden implement of claim 5, wherein the fluid includes at least one of a sterilizing fluid or a lubricating fluid.

22. Gardening shears, comprising:
a pin defining an axis of rotation;
a first blade configured to rotate about the axis of rotation;
a second blade configured to rotate about the axis of rotation;
a first handle shaft extending from the first blade along a lengthwise handle shaft axis, the first handle shaft defining a first ridge, the first ridge oriented along a ridge axis that is oriented perpendicularly to the axis of rotation and the lengthwise handle shaft axis, the first ridge projecting beyond an end surface of the first handle shaft in a direction parallel with the lengthwise handle shaft axis;
a second handle shaft extending from the second blade, the second handle shaft defining a second ridge;
a first spring-loaded detent oriented along a longitudinal direction that is parallel to the lengthwise handle shaft axis and perpendicular to (i) the axis of rotation and (ii) the ridge axis, the first spring-loaded detent configured to at least partially protrude from the first ridge and in the longitudinal direction when the first spring-loaded detent is in a relaxed state;

a second spring-loaded detent configured to at least partially protrude from the second ridge when the second spring-loaded detent is in a relaxed state;

a first detachable handle defining a cavity configured to contain a fluid and having a first channel configured to receive the first ridge, a top surface of the first ridge configured to abut a bottom surface of the first channel when the first ridge is disposed in the first channel, the first channel defining a first concavity configured to receive the first spring-loaded detent when the first ridge is disposed in the first channel;

a second detachable handle having a second channel configured to receive the second ridge, the second channel defining a second concavity configured to receive the second spring-loaded detent when the second ridge is disposed in the second channel;

a first locking mechanism configured to lock the first handle shaft to the first detachable handle;

a second locking mechanism configured to lock the second handle shaft to the second detachable handle;

a first tube having a first end disposed within the cavity and a second end disposed in the first channel; and a second tube having an end disposed in the first ridge such that when the first ridge is disposed in the first channel, the first tube is fluidically coupled to the second end of the second tube.

23. The garden implement of claim 22, wherein the first detachable handle is configured to be completely removed from the first handle shaft without the use of a tool.

* * * * *